(12) United States Patent
Nishimachi

(10) Patent No.: US 12,165,813 B2
(45) Date of Patent: Dec. 10, 2024

(54) BUS BAR FOR CAPACITOR ELEMENTS, CAPACITOR, AND POWER CONVERSION DEVICE

(71) Applicant: DENSO CORPORATION, Kariya (JP)

(72) Inventor: Seiichiro Nishimachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 252 days.

(21) Appl. No.: 17/954,850

(22) Filed: Sep. 28, 2022

(65) Prior Publication Data

US 2023/0021288 A1 Jan. 19, 2023

Related U.S. Application Data

(63) Continuation of application No. PCT/JP2021/004104, filed on Feb. 4, 2021.

(30) Foreign Application Priority Data

Mar. 30, 2020 (JP) ................................ 2020-060724

(51) Int. Cl.
*H01G 4/38* (2006.01)
*H02M 7/00* (2006.01)
*H02M 7/537* (2006.01)
*H02P 27/06* (2006.01)

(52) U.S. Cl.
CPC .............. *H01G 4/38* (2013.01); *H02M 7/003* (2013.01); *H02M 7/537* (2013.01); *H02P 27/06* (2013.01)

(58) Field of Classification Search
CPC ........ H01G 4/38; H02M 7/003; H02M 7/537; H02P 27/06

USPC .......................................................... 363/131
See application file for complete search history.

(56) References Cited

U.S. PATENT DOCUMENTS

| | | | | |
|---|---|---|---|---|
| 11,088,649 B2* | 8/2021 | Kitamura | ................ | B60L 50/60 |
| 2014/0294045 A1* | 10/2014 | Hironaka | ............... | H01G 9/008 |
| | | | | 374/142 |
| 2015/0340966 A1* | 11/2015 | Mutsuura | ............ | H02M 7/5387 |
| | | | | 363/98 |
| 2018/0330895 A1* | 11/2018 | Nagayoshi | ............. | H01G 9/042 |

FOREIGN PATENT DOCUMENTS

| | | |
|---|---|---|
| JP | 2008-251594 A | 10/2008 |
| JP | 2009-099884 A | 5/2009 |
| JP | 2011-096917 A | 5/2011 |

* cited by examiner

*Primary Examiner* — Yemane Mehari
(74) *Attorney, Agent, or Firm* — Oliff PLC

(57) ABSTRACT

A bus bar for a plurality of capacitor elements having an equal impedance includes a positive electrode bus bar and a negative electrode bus bar. The positive electrode bus bar and the negative electrode bus bar each includes a main bus bar and branch bus bars. The main bus bar is electrically connected to an electric circuit having a switching element. First ends of the branch bus bars are connected to the main bus bar at different positions, and second ends of the branch bus bars are connected to the capacitor elements. The branch bus bars are configured so that an impedance between the first end and the second end reduces as an impedance between a connecting portion of the main bus bar to the electric circuit and a connecting portion of the first end of the branch bus bar to the main bus bar increases.

8 Claims, 12 Drawing Sheets

BUS BAR FOR CAPACITOR ELEMENTS, CAPACITOR, AND POWER CONVERSION DEVICE

CROSS REFERENCE TO RELATED APPLICATIONS

The present application is a continuation application of International Patent Application No. PCT/JP2021/004104 filed on Feb. 4, 2021, which designated the U.S. and claims the benefit of priority from Japanese Patent Application No. 2020-060724 filed on Mar. 30, 2020. The entire disclosures of all of the above applications are incorporated herein by reference.

TECHNICAL FIELD

The present disclosure relates to a bus bar for capacitor elements including a positive electrode bus bar and a negative electrode bus bar, a capacitor, and a power conversion device.

BACKGROUND

For example, a case-molded capacitor includes a plurality of capacitors, and a positive electrode bus bar and a negative electrode bus bar are connected to the capacitors.

SUMMARY

The present disclosure describes a bus bar for capacitor elements including a positive electrode bus bar and a negative electrode bus bar, a capacitor, and a power conversion device.

BRIEF DESCRIPTION OF DRAWINGS

Features and advantages of the present disclosure will become more apparent from the following detailed description made with reference to the accompanying drawings, in which.

DETAILED DESCRIPTION

Figure 1:
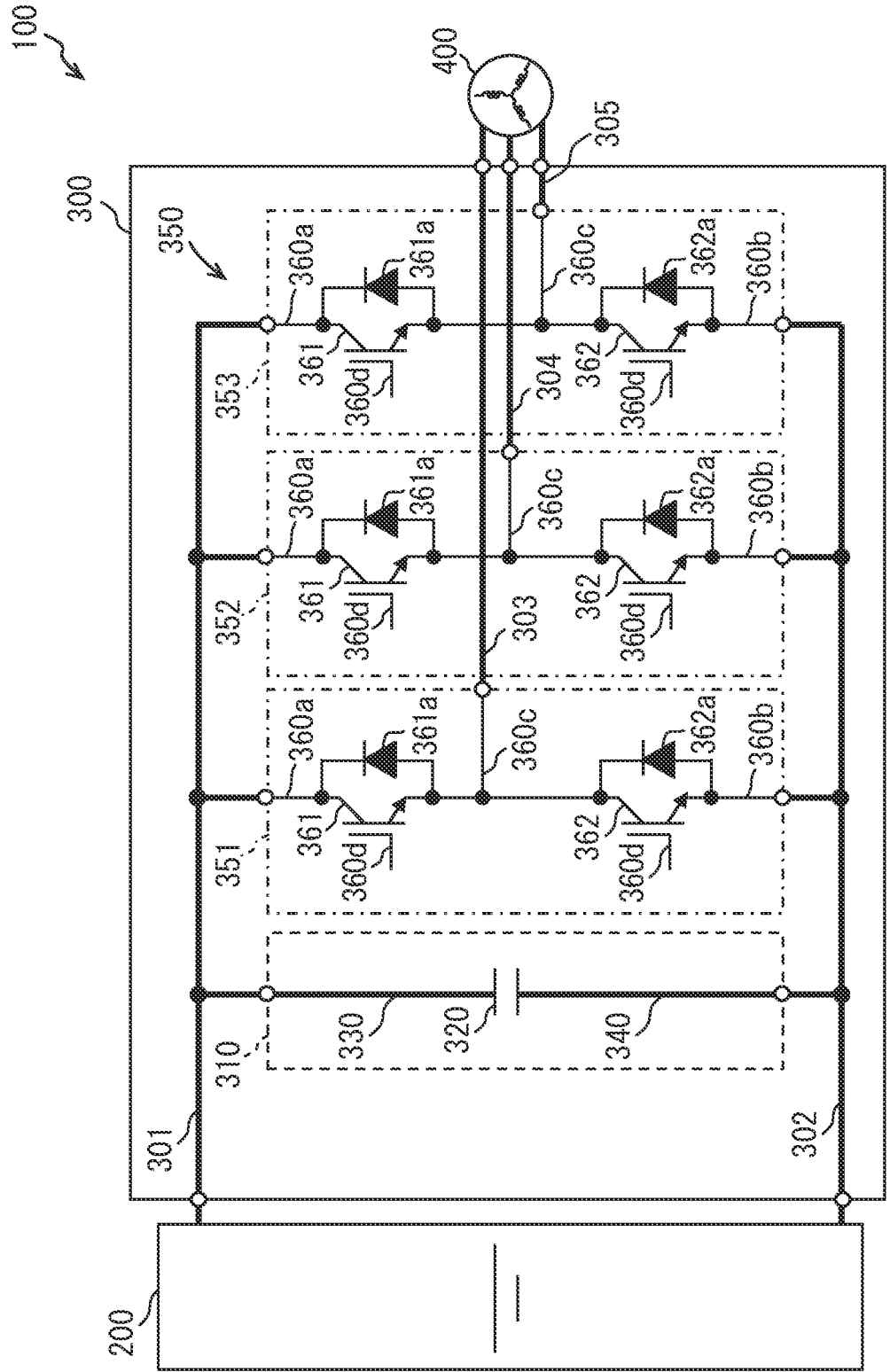
FIG. 1 is a circuit diagram illustrating an in-vehicle system.

To begin with, a relevant technology will be described only for understanding the embodiments of the present disclosure.

In a case-molded capacitor including a plurality of capacitors to which a positive electrode bus bar and a negative electrode bus bar are connected, if the amount of current is uneven between the capacitors, the amount of heat generation may be different between the capacitors. Due to such a difference in the amount of heat generation, there is a possibility that the lifetime will be different between the capacitors (capacitor elements).

The present disclosure provides a bus bar for capacitor elements, a capacitor, and a power conversion device, which are capable of suppressing a difference in the amount of currents flowing through the capacitors.

According to an aspect of the present disclosure, a bus bar is for a plurality of capacitor elements having an equal impedance. The bus bar includes a positive electrode bus bar and a negative electrode bus bar to electrically connect the plurality of capacitor elements and an electric circuit having a switching element. Each of the positive electrode bus bar and the negative electrode bus bar has a main bus bar electrically connected to the electric circuit, and a plurality of branch bus bars having first ends connected to the main bus bar at different positions and second ends individually connected to the capacitor elements. The branch bus bars are configured so that an impedance between the first end and the corresponding capacitor element reduces as an impedance between a connecting portion of the main bus bar to the electric circuit and a connecting portion of the branch bus bar to the main bus bar increases.

According to an aspect of the present disclosure, a capacitor includes a plurality of capacitor elements having an equal inductance; and a positive electrode bus bar and a negative electrode bus bar electrically connecting the plurality of capacitor elements and an electric circuit including a switching element. Each of the positive electrode bus bar and the negative electrode bus bar has a main bus bar electrically connected to the electric circuit, and a plurality of branch bus bars having first ends connected to the main bus bar at different positions and second ends individually connected to the capacitor elements. The branch bus bars are configured so that an impedance between the first end and the corresponding capacitor element reduces as an impedance between a connecting portion of the main bus bar to the electric circuit and a connecting portion of the branch bus bar to the main bus bar increases.

According to an aspect of the present disclosure, a power conversion device includes: an electric circuit having a switching element, a plurality of capacitor elements having an equal impedance; a positive electrode bus bar; and a negative electrode bus bar. The positive electrode bus bar and the negative electrode bus bar electrically connect the plurality of capacitor elements and the electric circuit. Each of the positive electrode bus bar and the negative electrode bus bar has a main bus bar electrically connected to the electric circuit, and a plurality of branch bus bars having first ends connected to the main bus bar at different positions and second ends individually connected to the capacitor elements. The branch bus bars are configured so that an impedance between the first end and the corresponding capacitor element reduces as an impedance between a connecting portion of the main bus bar to the electric circuit and a connecting portion of the branch bus bar to the main bus bar increases.

According to such configurations, an occurrence of a difference in impedance between each of the plurality of capacitor elements and the electric circuit is suppressed. Therefore, it is possible to suppress an occurrence of a difference in the amount of current flowing through each of the plurality of capacitor elements having the equal inductance.

As a result, an occurrence of a difference in Joule heat generated in each of the plurality of capacitor elements is suppressed. Therefore, it is possible to suppress a difference in lifetime between the plurality of capacitor elements.

In addition, it is less likely that a Coulomb force generated in some of the plurality of capacitor elements will be extremely high. Even if a plurality of capacitor elements show a behavior of vibrating due to a change in the action direction of the Coulomb force due to the time change of the current, it is less likely that the amplitude of the vibration will be partially increased.

Embodiments of the present disclosure will be hereinafter described with reference to the drawings. Part corresponding to the elements described in the preceding embodiments are denoted by the same reference numerals, and redundant explanation may be omitted. If only a part of the configuration of an embodiment is described, the other parts of the embodiment can be implemented by application of the configuration of the preceding embodiment.

If it is specifically described that combination of parts is possible in an embodiment, the parts can be combined. Further, even if it is not explicitly described, it is possible to partially combine the embodiments, an embodiment and a modification, or modifications as long as there are no discrepancy in such combinations.

First Embodiment

<In-Vehicle System>

An in-vehicle system 100 having a power conversion device 300 therein will be described with reference to FIG. 1. The in-vehicle system 100 is a system for an electric vehicle. The in-vehicle system 100 includes a battery 200, a power conversion device 300, and a motor 400.

The in-vehicle system 100 further includes a plurality of electronic control units (ECUs), although not shown. The ECUs transmit and receive signals to and from each other via a bus wiring. The ECUs cooperate to control an electric vehicle. The ECUs control regeneration and power running of the motor 400 according to a state of charge (SOC) of the battery 200.

The battery 200 has a plurality of secondary batteries. The secondary batteries form a battery stack connected in series. The SOC of the battery stack corresponds to the SOC of the battery 200. As the secondary batteries, a lithium ion secondary battery, a nickel hydrogen secondary battery, an organic radical battery, or the like can be adopted.

The power conversion device 300 performs power conversion between the battery 200 and the motor 400. The power conversion device 300 converts direct current (DC) power of the battery 200 into AC power. The power conversion device 300 converts alternate current (AC) power generated by power generation (regeneration) of the motor 400 into DC power.

The motor 400 is connected to an axle of an electric vehicle (not shown). The rotational energy of the motor 400 is transmitted to traveling wheels of the electric vehicle via the axle. On the contrary, the rotational energy of the traveling wheels is transmitted to the motor 400 via the axle.

The motor 400 is driven by the AC power supplied from the power conversion device 300. With this, a propulsive force is applied to the traveling wheels. Further, the motor 400 is regenerated by the rotational energy transmitted from the traveling wheels. The power conversion device 300 converts the AC power obtained by the regeneration of the motor 400 into the DC power. The DC power converted by the power conversion device 300 is supplied to the battery 200. The DC power is also supplied to various electric loads mounted on the electric vehicle.

<Power Conversion Device>

Next, the power conversion device 300 will be described. The power conversion device 300 includes an inverter. The inverter converts DC power of battery 200 into AC power. This AC power is supplied to the motor 400. Further, the inverter converts the AC power generated by the motor 400 into DC power. This DC power is supplied to the battery 200.

As shown in FIG. 1, the power conversion device 300 includes a positive (P) bus bar 301 and a negative (N) bus bar 302. The battery 200 is connected to these P bus bar 301 and N bus bar 302. The P bus bar 301 is connected to a positive electrode of the battery 200. The N bus bar 302 is connected to a negative electrode of the battery 200.

The power conversion device 300 includes a U-phase bus bar 303, a V-phase bus bar 304, and a W-phase bus bar 305. The U-phase bus bar 303, the V-phase bus bar 304 and the W-phase bus bar 305 are connected to the motor 400. In FIG. 1, connection points of the various bus bars are indicated by white circles. At these connection points, parts are electrically connected by bolts or welding, for example.

The power conversion device 300 has a smoothing capacitor 310 and a switch group 350. The P bus bar 301 and the N bus bar 302 are electrically connected to the smoothing capacitor 310 and the switch group 350, respectively. The smoothing capacitor 310 will be described in detail later.

The switch group 350 includes three-phase switch modules, such as a U-phase switch module 351, a V-phase switch module 352, and a W-phase switch module 353. Each of the three-phase switch modules includes a high-side switch 361 and a low-side switch 362. In addition, each of the three-phase switch modules includes a high-side diode 361a and a low-side diode 362a. These switches and diodes are covered with and protected by a sealing resin. The switch group 350 is included in an electric circuit.

In the present embodiment, an n-channel type IGBT is employed to each of the high-side switch 361 and the low-side switch 362. As shown in FIG. 1, an emitter electrode of the high-side switch 361 and a collector electrode of the low-side switch 362 are connected to each other. Thus, the high-side switch 361 and the low-side switch 362 are connected in series.

Further, a cathode electrode of the high-side diode 361a is connected to a collector electrode of the high-side switch 361. An anode electrode of the high-side diode 361a is connected to an emitter electrode of the high-side switch 361. Thus, the high-side diode 361a is connected in anti-parallel to the high-side switch 361.

Similarly, a cathode electrode of the low-side diode 362a is connected to a collector electrode of the low-side switch 362. An anode electrode of the low-side diode 362a is connected to an emitter electrode of the low-side switch 362. Thus, the low-side diode 362a is connected in anti-parallel to the low-side switch 362.

As described above, the switches are covered with and protected by the sealing resin. Terminals are respectively connected to the collector electrode of the high-side switch 361, a midpoint between the high-side switch 361 and the low-side switch 362, and the emitter electrode of the low-side switch 362. Ends of these terminals are exposed from the sealing resin. Terminals are respectively connected to gate electrodes and the high-side switch 361 and the low-side switch 362, and ends of the terminals are exposed from the sealing resin. In the following, these terminals are referred to as a collector terminal 360a, a midpoint terminal 360c, an emitter terminal 360b, and a gate terminal 360d, respectively.

As shown in FIG. 1, the collector terminal 360a is connected to the P bus bar 301. The emitter terminal 360b is connected to the N bus bar 302. With such an electrical connection, the high-side switch 361 and the low-side switch 362 are serially connected from the P bus bar 301 side to the N bus bar 302 side.

The midpoint terminal 360c of the U-phase switch module 351 is connected to the U-phase bus bar 303. The midpoint terminal 360c of the V-phase switch module 352 is connected to the V-phase bus bar 304. The midpoint terminal 360c of the W-phase switch module 353 is connected to the W-phase bus bar 305.

The U-phase bus bar 303 is connected to a U-phase stator coil of the motor 400. The V-phase bus bar 304 is connected to a V-phase stator coil of the motor 400. The W-phase bus bar 305 is connected to a W-phase stator coil of the motor 400.

The gate terminals 360d of the high-side switch 361 and the low-side switch 362 included in the U-, V-, and W-phase switch modules 351, 352, and 353 are connected to a gate driver. The gate driver is connected to the ECU described above.

The ECU generates a control signal and outputs the control signal to the gate driver. The gate driver amplifies the control signal and outputs the control signal to the gate terminal 360d. In this configuration, the high-side switch 361 and the low-side switch 362 are controlled to open and close by the ECU. The ECU generates a pulse signal as the control signal. The ECU adjusts the on-duty ratio and the frequency of the pulse signal. The on-duty ratio and the frequency of the pulse signal are determined based on outputs from sensors (not shown), such as a current sensor and a rotation angle sensor.

When the motor 400 is powered, the high-side switch 361 and the low-side switch 362 of each of the three-phase switch modules are controlled in a pulse-width modulation (PWM) by the control signal output from the ECU. Thus, three-phase alternating currents are generated in the power conversion device 300. The three-phase alternating currents are input to the three-phase stator coils via the three-phase bus bars. As a result, three-phase rotating magnetic fields are generated in the stator coil. Due to the interaction between the three-phase rotating magnetic fields and the magnetic field generated by the rotor of the motor 400, rotational torque is generated in the rotor.

When the motor 400 generates (regenerates) power due to the rotational energy of the traveling wheels, the ECU stops outputting the control signal, for example. With this, the AC power generated by the power generation passes through the diodes provided in the three-phase switch modules. As a result, the AC power is converted into the DC power.

The types of switch elements included in each of the U-, V-, and W-phase switch modules 351 to 353 are not particularly limited, and MOSFETs can be used, for example. Semiconductor elements such as the switches and the diodes included in these switch modules may be formed of a semiconductor such as Si or a wide-gap semiconductor such as SiC. The material of the semiconductor elements is not particularly limited.

The number of the high-side switch 361 and the number of the low-side switch 362 included in each of the three phase switch modules is not limited to singular. At least one of the three-phase switch modules may include plural high-side switches 361 connected in parallel and plural low-side switches 362 connected in parallel.

<Smoothing Capacitor>

Next, the smoothing capacitor 310 will be described. Hereinafter, three directions orthogonal to each other are referred to as an x-direction, a y-direction, and a z-direction. In the drawings, the x-direction, the y-direction and the z-direction are simply indicated as "x", "y" and "z" by omitting the term "direction".

As shown in FIG. 1, the smoothing capacitor 310 includes a capacitor element 320, a positive electrode bus bar 330, and a negative electrode bus bar 340. The smoothing capacitor 310 also has an insulating case (not shown). The capacitor element 320, the positive electrode bus bar 330, and the negative electrode bus bar 340 are housed in the insulating case. Further, the capacitor element 320, the positive electrode bus bar 330, and the negative electrode bus bar 340 are covered with a resin material inside the insulating case. The insulating case is fixed to a case of the power conversion device 300 together with the switch group 350 described above. In this case, the insulating case is, for example, fixed by bolting. The smoothing capacitor 310 corresponds to a capacitor.

<Capacitor Element>

Figure 2:
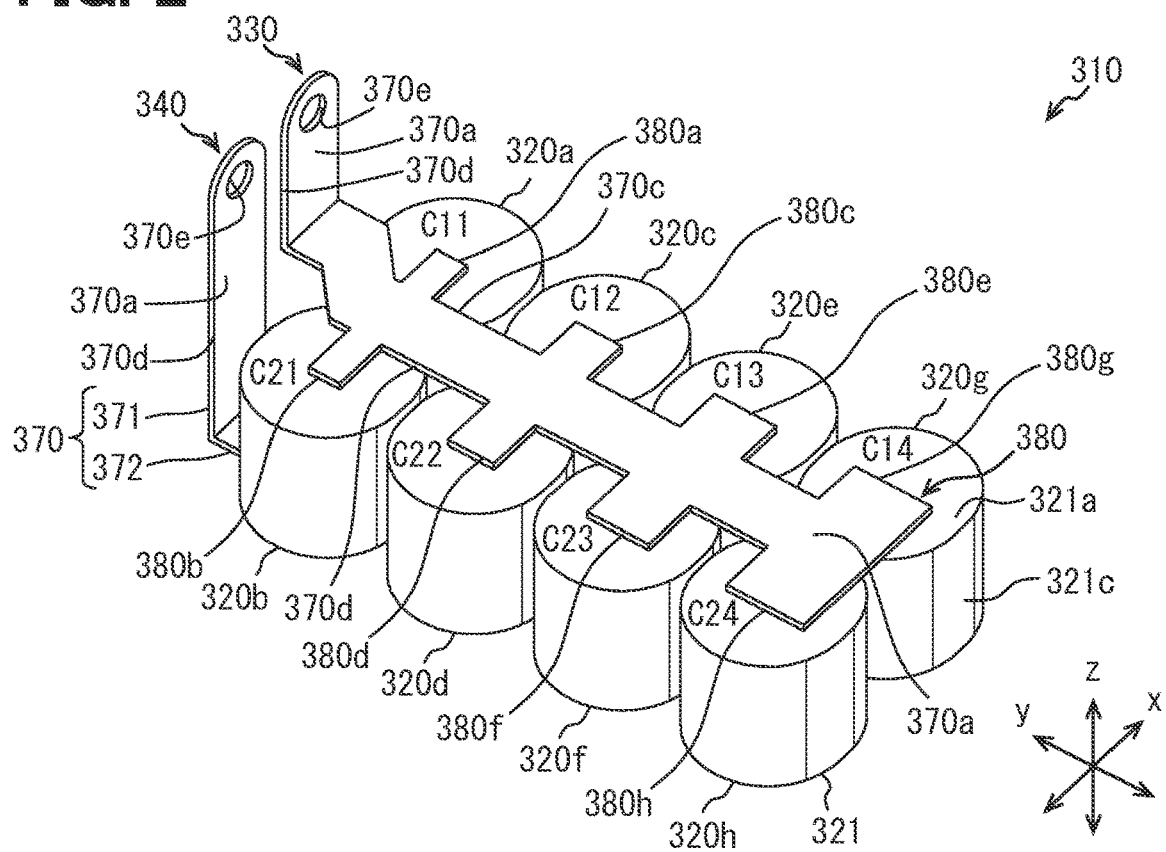
FIG. 2 is a perspective view of a smoothing capacitor according to a first embodiment.

As shown in FIG. 2, the smoothing capacitor 310 has eight capacitor elements 320. The eight capacitor elements 320 are substantially the same products. Therefore, the eight capacitor elements 320 have the same capacitance and the same inductance with each other. Note that the capacitance and the inductance of these eight capacitor elements 320 include a difference of about ±5% due to manufacturing errors or the like. In order to simplify the description below, the eight capacitor elements 320 are given ordinal numbers and indicated as first capacitor element 320a to eighth capacitor element 320h as necessary.

Each of the eight capacitor elements 320 has a positive electrode and a negative electrode facing each other with a separator interposed therebetween, and a capacitor case 321 for housing the positive electrode, the negative electrode and the separator therein. For example, as shown in FIG. 2, the capacitor case 321 has a columnar shape defining an axial direction along the z direction. The capacitor case 321 has an upper end surface 321a and a lower end surface 321b spaced apart in the z-direction, and an annular side surface 321c connecting between the upper end surface 321a and the lower end surface 321b.

Although not shown, the upper end surface 321a is provided with a positive terminal that is electrically connected to the positive electrode described above. The lower end surface 321b is provided with a negative terminal that is electrically connected to the negative electrode described above.

As shown in FIG. 2, the eight capacitor elements 320 are arranged in a matrix with the y direction as a row direction and the x direction as a column direction. In the present embodiment, the eight capacitor elements 320 are arranged in two rows and four columns.

Figure 3:
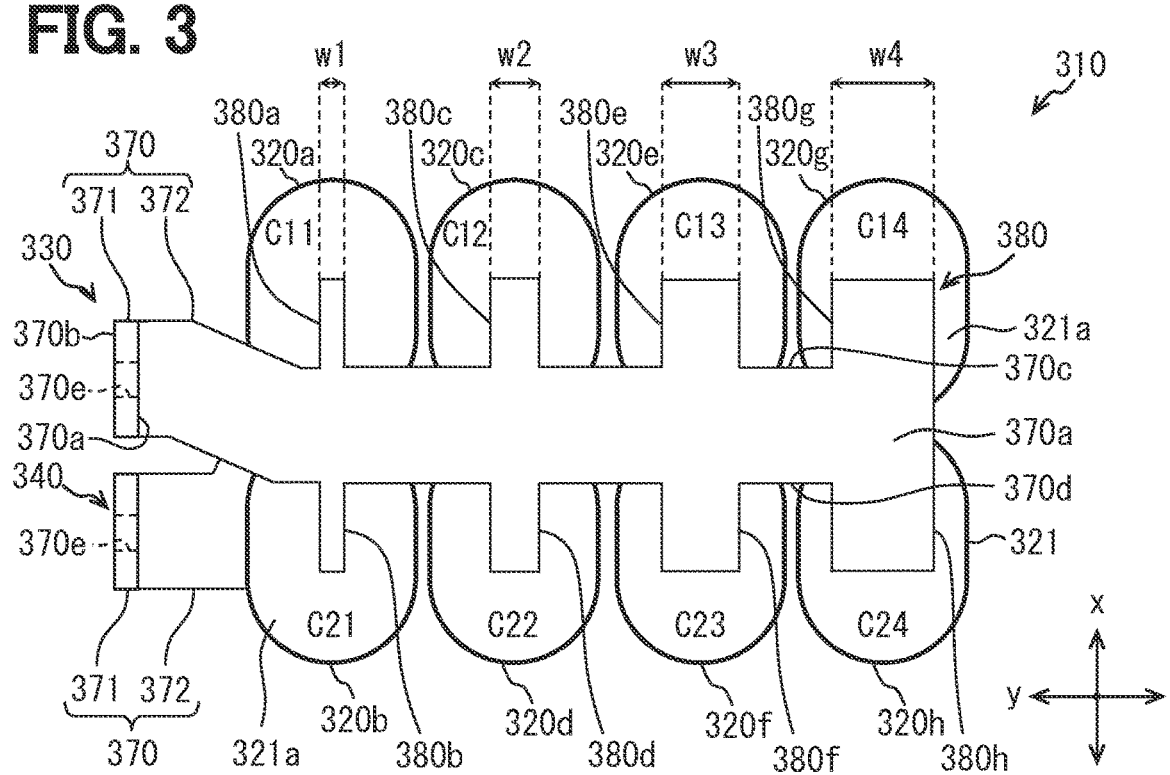
FIG. 3 is a top view of the smoothing capacitor.
Figure 5:
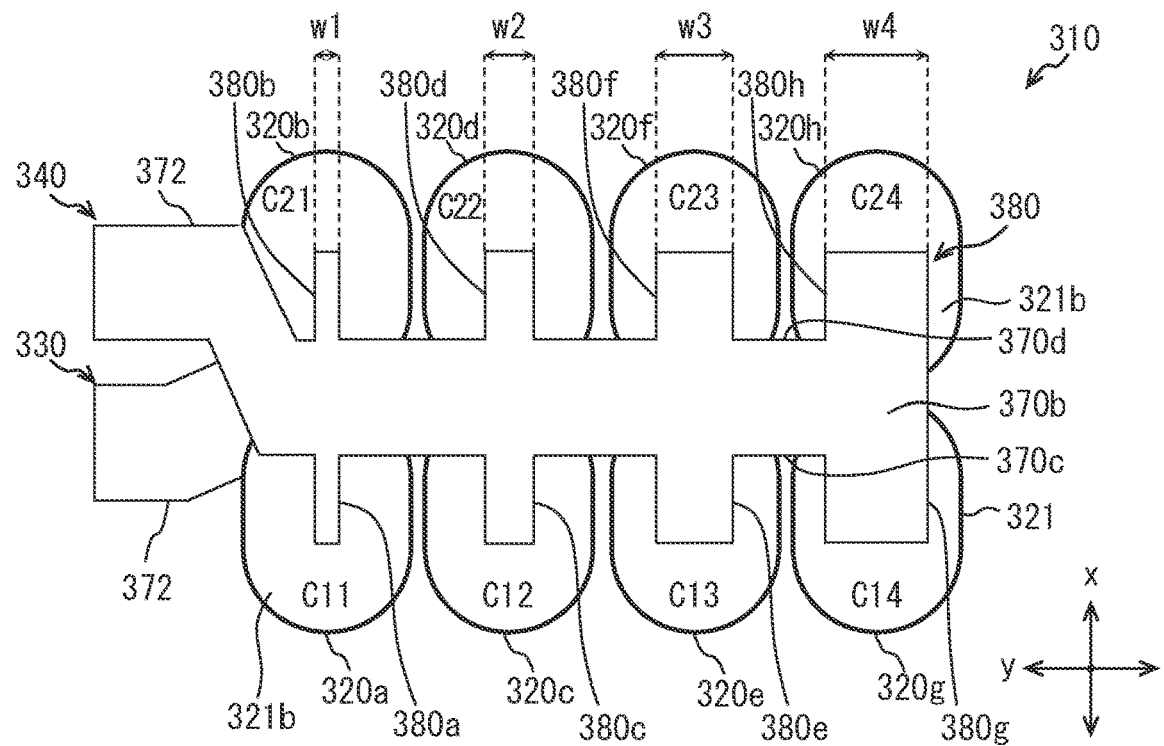
FIG. 5 is a bottom view of the smoothing capacitor.

As shown in FIGS. 3 and 5, four capacitor elements 320 are arranged in the row direction with the ordinal numbers increasing gradually. Four capacitor elements 320 with odd ordinal numbers are arranged in a first row. Four capacitor elements 320 with even ordinal numbers are arranged in a second row. Two capacitor elements 320 with consecutive ordinal numbers are arranged in the column direction.

Specifically, a first capacitor element 320a, a third capacitor element 320c, a fifth capacitor element 320e, and a seventh capacitor element 320g are arranged in the stated order in the y direction in the first row. Likewise, a second capacitor element 320b, a fourth capacitor element 320d, a sixth capacitor element 320f, and an eighth capacitor element 320h are arranged in the stated order in the y direction in the second row.

In the drawing, the eight capacitor elements 320 arranged in a matrix are given the symbol "Cnm", where n is the row number and m is the column number. The four capacitor elements 320 with the odd ordinal numbers located in the first row are assigned symbols C11, C12, C13 and C14. The four capacitor elements 320 with the even ordinal numbers located in the second row are assigned symbols C21, C22, C23 and C24.

Figure 4:
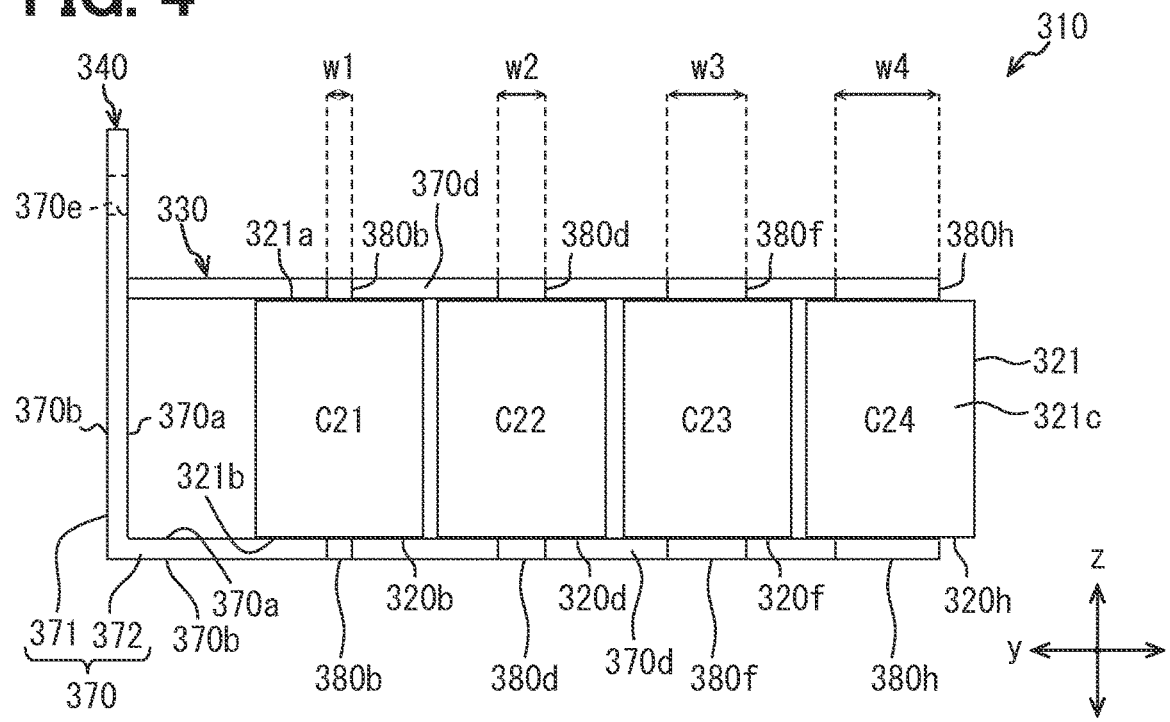
FIG. 4 is a side view of the smoothing capacitor.

As shown in FIG. 4, the upper end surfaces 321a of the eight capacitor elements 320 are at the same position in the z direction. Namely, the eight upper end surfaces 321a are flush with each other. Therefore, the positive terminals of the eight capacitor elements 320 are at the same position in the z direction. The eight positive terminals are also arranged in a matrix of two rows and four columns. These eight positive terminals are connected to the positive electrode bus bar 330.

Similarly, the lower end surfaces 321b of the eight capacitor elements 320 are at the same position in the z direction. The eight lower end surfaces 321b are flush with each other. Therefore, the negative terminals of the eight capacitor elements 320 are at the same position in the z direction. The eight negative terminals are also arranged in a matrix of two rows and four columns. These eight negative terminals are connected to the negative electrode bus bar 340.

<Positive Electrode Bus Bar and Negative Electrode Bus Bar>

The positive electrode bus bar 330 and the negative electrode bus bar 340 are produced by pressing a metal flat plate. The positive electrode bus bar 330 is provided on the upper end surface 321a side of the eight capacitor elements 320. The negative electrode bus bar 340 is provided on the lower end surface 321b side of the eight capacitor elements 320. The positive electrode bus bar 330 and the negative electrode bus bar 340 correspond to a bus bar for capacitor elements.

Each of the positive electrode bus bar 330 and the negative electrode bus bar 340 has a main bus bar 370 and a branch bus bar 380. In the present embodiment, eight branch bus bars 380 are integrally connected to one main bus bar 370.

The main bus bar 370 of the positive electrode bus bar 330 is fixed to the P bus bar 301 through a bolt. Each of the eight branch bus bars 380 is individually joined to each of the eight positive terminals by soldering, welding, or the like.

The main bus bar 370 of the negative electrode bus bar 340 is fixed to the N bus bar 302 through a bolt. Each of the eight branch bus bars 380 is individually joined to each of the eight negative terminals by soldering, welding, or the like.

With the electrical connection described above, the eight capacitor elements 320 are connected in parallel to each other between the P bus bar 301 and the N bus bar 302 via the positive electrode bus bar 330 and the negative electrode bus bar 340. The impedance of an electrical conduction path between the P bus bar 301 and the N bus bar 302 of each of the eight capacitor elements 320 is determined by the electrical resistance and inductance of each of the positive electrode bus bar 330 and the negative electrode bus bar 340 and the conductance of the capacitor element 320.

<Main Bus Bar>

As shown in FIGS. 2 to 5, the main bus bar 370 has a first extension portion 371 and a second extension portion 372 extending in different directions. A cross-sectional area of each of the first extension portion 371 and the second extension portion 372, defined in a direction orthogonal to the extension direction is constant in the extension direction. Therefore, the impedance in the extension direction of these extension portions is constant.

The first extension portion 371 and the second extension portion 372 are connected to each other at the ends thereof. The first extension portion 371 extends in the z direction to separate from a connecting portion with the second extension portion 372. The second extension portion 372 extends in the y direction to separate from a connecting portion with the first extension portion 371.

The first extension portion 371 has a thin flat plate shape defining a thickness direction in the y direction. The second extension portion 372 has a thin flat plate shape defining a thickness direction in the z direction. Each of the first extension portion 371 and the second extension portion 372 has an upper surface 370a and a lower surface 370b opposite in the thickness direction thereof. The angle defined between the upper surface 370a of the first extension portion 371 and upper surface 370a of the second extension portion 372 is 90°. The angle defined between the lower surface 370b of the first extension portion 371 and the lower surface 370b of the second extension portion 372 is 270°. Therefore, a plane surface of the main bus bar 370 facing in the x direction has an L-shape. Of course, the angle defined between the first extension portion 371 and the second extension portion 372 can be changed as appropriate.

The first extension portion 371 is formed with a through hole 370e at an end away from the connecting portion with the second extension portion 372. The through hole 370e opens on the upper surface 370a and on the lower surface 370b. The through hole 370e is used for fixing the P bus bar 301 or the N bus bar 302 to the first extension portion 371 through the bolt. The through hole 370e corresponds to a connection portion with the electric circuit.

Each of the first extension portion 371 and the second extension portion 372 has a first side surface 370c and a second side surface 370d opposite in the x-direction. The branch bus bars 380 are integrally connected to each of the first side surface 370c and the second side surface 370d of the second extension portion 372. A location where the branch bus bar 380 connects to the main bus bar 370 corresponds to a connecting location.

<Branch Bus Bar>

As shown in FIGS. 3 and 5, the branch bus bar 380 extends in the x-direction to separate from the side surface of the second extension 372. The extending directions of the branch bus bars 380 connected to the first side surface 370c and the extending directions of the branch bus bars 380 connected to the second side surface 370d are opposite in the x direction. An end of the branch bus bar 380 connecting to the side surface of the main bus bar 370 corresponds to a first end.

Four branch bus bars 380 are connected to the first side surface 370c and four branch bus bars 380 are connected to the second side surface 370d. Connecting positions of the four branch bus bars 380 on the same side surface are different in the y direction. The four branch bus bars 380 connected to the first side surface 370c are spaced apart in the y direction. The four branch bus bars 380 connected to the second side surface 370d are spaced apart in the y direction.

These eight branch bus bars 380 are arranged in a matrix of two rows and four columns with the y direction as the row direction and the x direction as the column direction. In order to simplify the explanation below, the eight branch bus bars 380 are given ordinal numbers and indicated as first branch bus bar 380a through eighth branch bus bar 380h as necessary.

A first branch bus bar 380a, a third branch bus bar 380c, a fifth branch bus bar 380e, and a seventh branch bus bar 380g are connected to the first side surface 370c. The ordinal numbers assigned to these four branch bus bars 380 increments as a function of distance from the connecting portion between the second extension portion 372 and the first extension portion 371 on the electrical conduction path of the bus bar 330, 340. In other words, the ordinal numbers assigned to these four branch bus bars 380 increases as a function of distance from the through hole 370e of the first extension portion 371 on the electrical conduction path of the bus bar 330, 340.

A second branch bus bar 380b, a fourth branch bus bar 380d, a sixth branch bus bar 380f, and an eighth branch bus bar 380h are connected to the second side surface 370d. The ordinal numbers assigned to these four branch bus bars 380 also increments as a function of distance from the connecting portion between the second extension portion 372 and the first extension portion 371 on the electrical conduction path of the bus bar. In other words, the ordinal numbers given to these four branch bus bars 380 also increase as a function of distance from the through hole 370e of the first extension portion 371 on the electrical conduction path of the bus bar.

The first branch bus bar 380a and the second branch bus bar 380b are aligned in the x direction. The third branch bus bar 380c and the fourth branch bus bar 380d are aligned in the x direction. The fifth branch bus bar 380e and the sixth branch bus bar 380f are aligned in the x direction. The seventh branch bus bar 380g and the eighth branch bus bar 380h are aligned in the x direction.

In the present embodiment, the eight branch bus bars 380 have the same thickness in the z direction and the same length in the x direction (extending direction). The two branch bus bars 380 aligned in the x direction have the same length (width) in the y direction. Therefore, the two branch bus bars 380 aligned in the x direction and having consecutive ordinal numbers have the same shape.

However, the four branch bus bars 380 arranged in the y direction have different lengths (widths) in the y direction. Therefore, the four branch bus bars 380 with odd ordinal numbers arranged in the y-direction have different shapes. The four branch bus bars 380 with even ordinal numbers arranged in the y direction also have different shapes.

The widths of the four branch bus bars 380 arranged in the y direction increase as the ordinal number increases, as indicated by w1, w2, w3, and w4 in FIGS. 3 to 5. Therefore, the cross-sectional areas of the branch bus bars 380 perpendicular to the extending direction of the branch bus bars 380 increase as the ordinal number increases. The impedances of the branch bus bars 380 in the extending direction decrease as the ordinal number increases.

<Connection of Capacitor Element and Bus Bar>

As shown in FIGS. 3 and 4, the positive electrode bus bar 330 is provided on the eight capacitor elements 320 such that the lower surface 370b of the second extension portion 372 faces the upper end surfaces 321a of the capacitor elements 320 in the z-direction. In this faced arrangement state, the first extension portion 371 of the positive electrode bus bar 330 is located outside the projection area of the eight capacitor elements 320 when projected in the z direction.

The first extension portion 371 of the positive electrode bus bar 330 extends in the z-direction to be away from the upper end surface 321a side and the lower end surface 321b side of the capacitor elements 320. The first extension portion 371 is positioned closest in the y direction to the two capacitor elements 320 with the smallest ordinal numbers in the first column, among the eight capacitor elements 320 arranged in two rows and four columns.

As shown in FIGS. 4 and 5, the negative electrode bus bar 340 is provided for the eight capacitor elements 320 in such a manner that the upper surface 370a of the second extension portion 372 faces the lower end surfaces 321b of the capacitor elements 320 in the z-direction. In this faced arrangement state, the first extension portion 371 of the negative electrode bus bar 340 is positioned outside the projection area of the eight capacitor elements 320 when projected in the z direction.

The first extension portion 371 of the negative electrode bus bar 340 extends from the lower end surface 321b side toward the upper end surface 321a side in the z direction. Similar to the first extension portion 371 of the positive electrode bus bar 330, the first extension portion 371 of the negative electrode bus bar 340 is positioned in the y direction closest to the two capacitor elements 320 with the smallest ordinal numbers located in the first column, among the eight capacitor elements 320 arranged in two rows and four columns.

The first extension portion 371 of the positive electrode bus bar 330 and the first extension portion 371 of the negative electrode bus bar 340 are arranged side by side in the x direction. The position of the first extension portion 371 of the positive electrode bus bar 330 in the x direction is the same as the position of the four odd-numbered capacitor elements 320 located in the first row in the x direction. The position of the first extension portion 371 of the negative electrode bus bar 340 in the x direction is the same as the position of the four even-numbered capacitor elements 320 located in the second row in the x direction. The second side surface 370d of the first extension portion 371 of the positive electrode bus bar 330 and the first side surface 370c of the first extension portion 371 of the negative electrode bus bar 340 face each other in the x direction while being spaced apart from each other in the x direction.

The second extension portion 372 of the positive electrode bus bar 330 is disposed between the four positive terminals in the first row and the four positive terminals in the second row, on the upper end surfaces 321a. The four branch bus bars 380 having odd ordinal numbers individually extend in the x direction from the first side surface 370c of the second extension portion 372 toward the corresponding four positive terminals in the first row. The four branch bus bars 380 having even ordinal numbers individually extend in the x direction from the second side surface 370d of the second extension portion 372 toward the corresponding four positive terminals in the second row. The ends of these eight branch bus bars 380 and the eight positive terminals are individually, electrically connected to each other.

The second extended portion 372 of the negative electrode bus bar 340 is disposed between the four negative terminals in the first row and the four negative terminals in the second row, on the lower end surfaces 321b. The four branch bus bars 380 having odd ordinal numbers extend individually in the x direction from the first side surface 370c of the second extension portion 372 toward the corresponding four negative terminals in the first row. The four branch bus bars 380 having even ordinal numbers individually extend in the x direction from the second side surface 370d of the second extension portion 372 toward the corresponding four negative terminals in the second row. The ends of these eight branch bus bars 380 and the eight negative terminals are correspondingly, electrically connected to each other. These ends of the branch bus bar 380 corresponds to a second end.

<Impedance>

Due to the configuration of the smoothing capacitor 310 detailed above, the length of the electrical conduction path between the through hole 370e of the positive electrode bus bar 330 to which the P bus bar 301 is connected and the positive terminal of the condenser element 320 increases with an increase in the column number of the capacitor element 320 to be connected. The length of the electrical conduction path between the through hole 370e of the negative electrode bus bar 340 to which the N bus bar 302 is connected and the negative terminal of the capacitor element 320 increases with an increase in the column number of the capacitor element 320 to be connected.

In terms of the symbols given to the eight capacitor elements 320, the length of the electrical conduction path of each of the positive electrode bus bar 330 and the negative electrode bus bar 340 increases with the increase in number, such as C11, C12, C13 and C14, of the capacitor elements 320 to be connected. The length of the electrical conduction path of each of the positive electrode bus bar 330 and the negative electrode bus bar 340 increases with the increase in number, such as C21, C22, C23 and C24, of the capacitor elements 320 to be connected.

In the case of the present embodiment, the extension of the electrical conduction path of each of the positive electrode bus bar 330 and the negative electrode bus bar 340 occurs in the main bus bar 370, of the main bus bar 370 and the branch bus bar 380. The impedance of the electrical conduction path between the through hole 370e of the main bus bar 370 and the branch bus bar 380 increases with an increase in the row number in which the branch bus bar 380 is located. In other words, the impedance of the electrical conduction path on the main bus bar 370 between the through hole 370e and the branch bus bar 380 increases as the distance of the connecting portion of the branch bus bar 380 to the main bus bar 370 from the through hole 370e increases.

On the other hand, the widths of the four branch bus bars 380 arranged in the y direction in each of the first and second rows increase as the column number in which the branch bus bars 380 are located increase. The impedance of the branch bus bar 380 connecting the main bus bar 370 and the capacitor element 320 decreases as the column number of the branch bus bar 380 increases. In other words, the impedances of the branch bus bars 380 decrease as the distance of the connecting positions of the branch bus bars 380 to the main bus bar 370 from the through hole 370e increase on the electrical conduction path.

Figure 6:
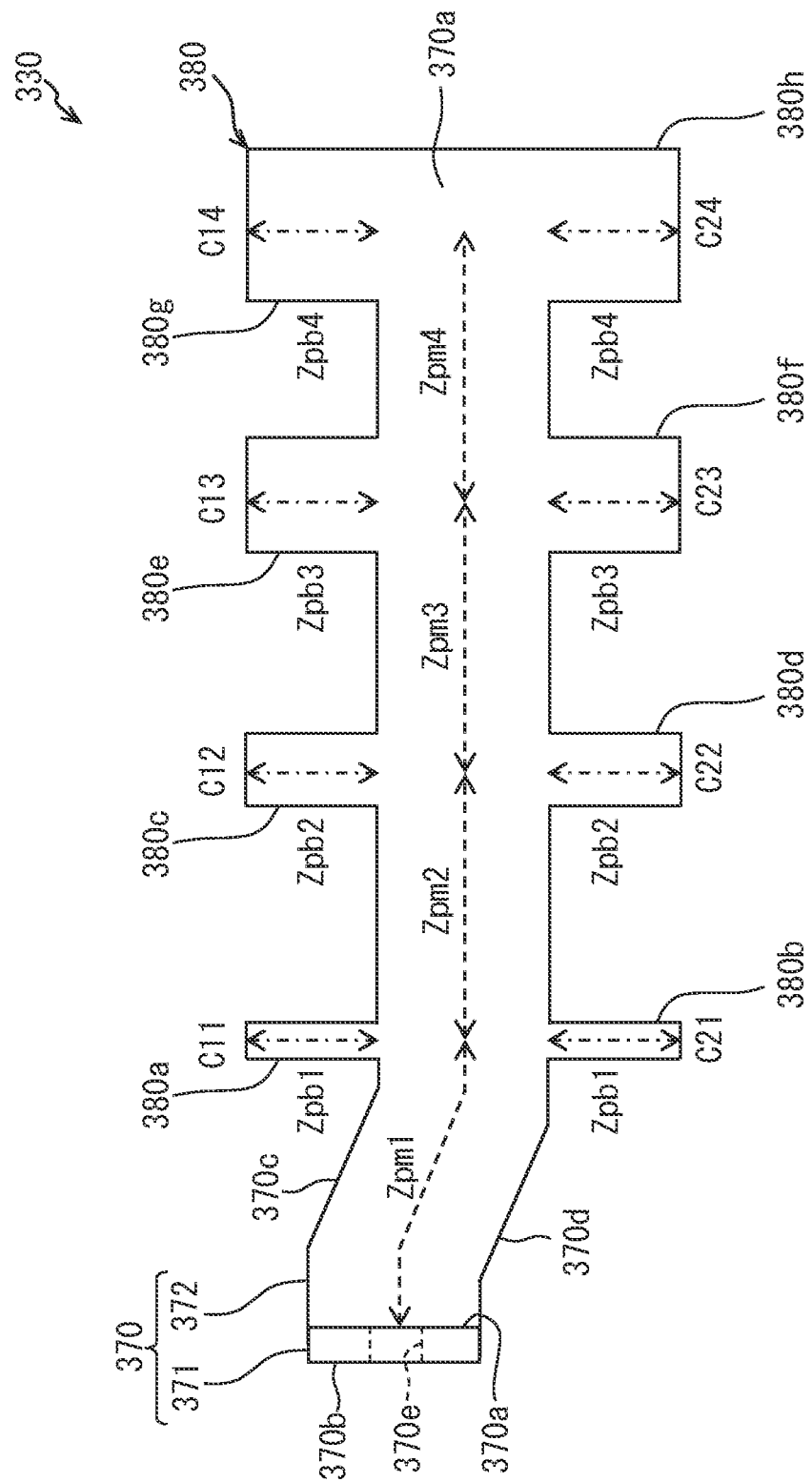
FIG. 6 is a top view of a positive electrode bus bar for explaining an impedance.
Figure 7:
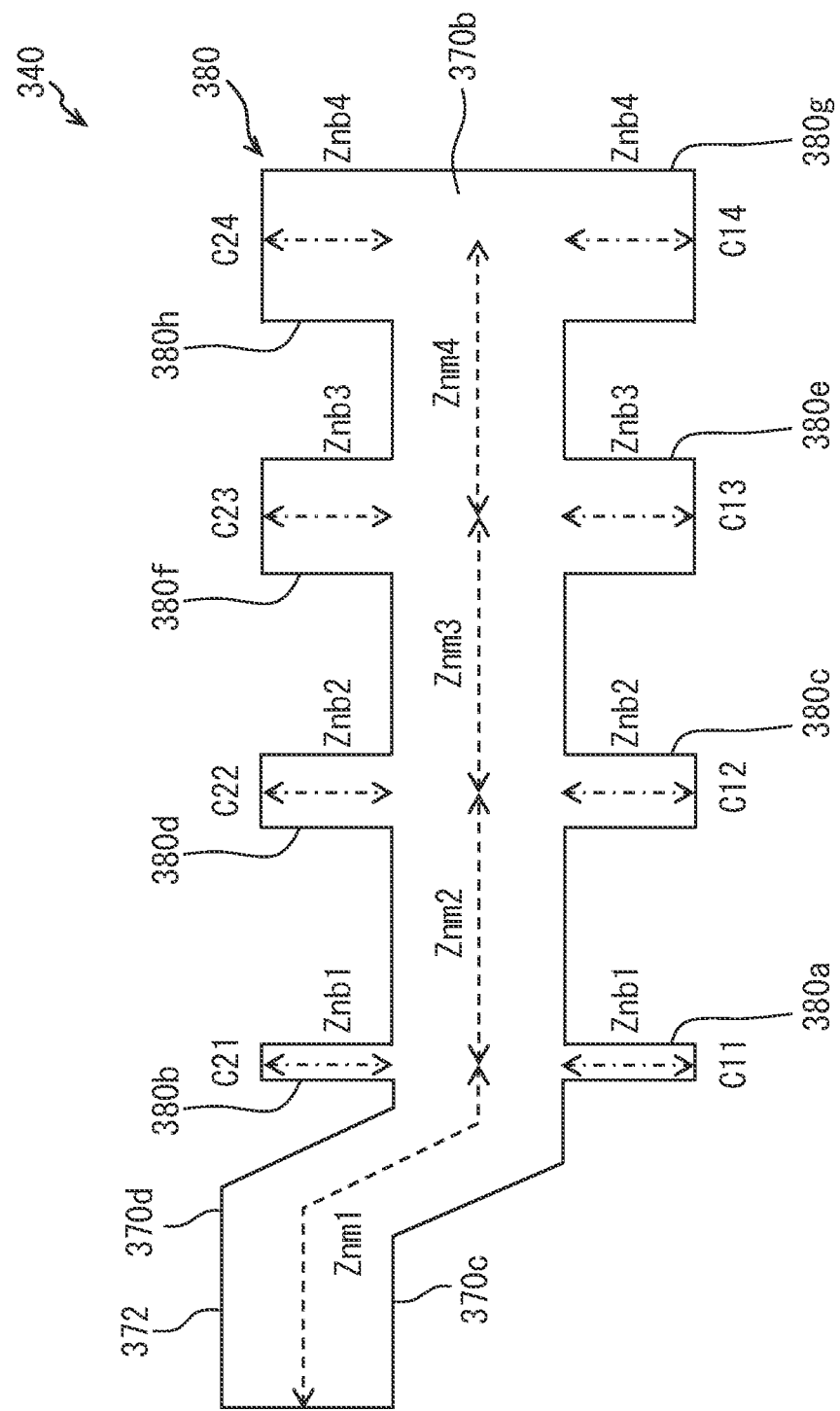
FIG. 7 is a bottom view of a negative electrode bus bar for explaining an impedance.

In FIGS. 6 and 7, the impedances of the main bus bar 370 and the branch bus bars 380 are indicated by symbols, in order to describe the impedance of the current conduction path in detail. The symbol Z indicates the impedance, the suffix p indicates the positive electrode bus bar 330, and the suffix n indicates the negative electrode bus bar 340. The impedance of the main bus bar 370 is indicated by the suffix "m", and the impedance of the branch bus bar 380 is indicated by the suffix "b".

In the main bus bar 370 of the positive electrode bus bar 330, the impedance between the through hole 370e and the branch bus bar 380 in the first column is represented by Zpm1, and the impedance between the branch bus bar 380 in the first column and the branch bus bar 380 in the second column is represented by Zpm2. In the main bus bar 370, the impedance between the branch bus bar 380 in the second column and the branch bus bar 380 in the third column is represented by Zpm3, and the impedance between the branch bus bar 380 in the third column and the branch bus bar 380 in the fourth column is represented by Zpm4. Further, the impedances of the branch bus bars 380 from the first column to the fourth column are orderly represented by Zpb1, Zpb2, Zpb3, and Zpb4, respectively.

In the main bus bar 370 of the negative electrode bus bar 340, the impedance between the through hole 370e and the branch bus bar 380 in the first column is represented by Znm1, and the impedance between the branch bus bar 380 in the first column and the branch bus bar 380 in the second column is represented by Znm2. The impedance between the branch bus bar 380 of the second column and the branch bus bar 380 of the third column in the main bus bar 370 is represented by Znm3, and the impedance between the branch bus bar 380 of the third column and the branch bus bar 380 of the fourth column is represented by Znm4. The impedances of the branch bus bars 380 from the first column to the fourth column are orderly represented by Znb1, Znb2, Znb3, and Znb4, respectively.

Figure 8:
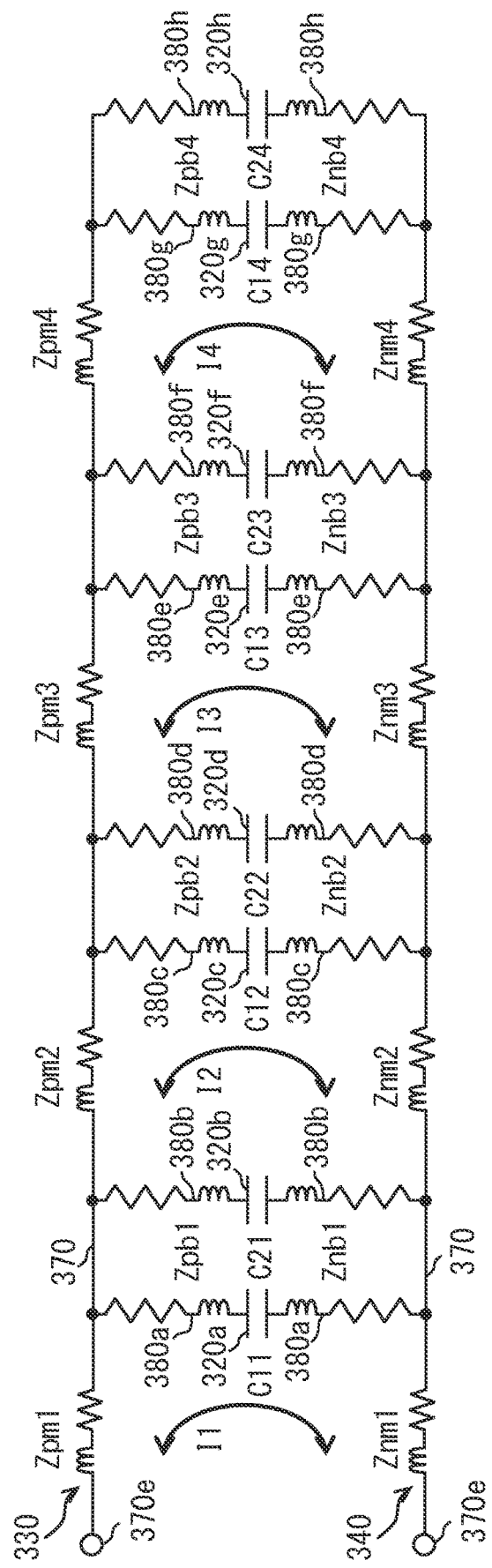
FIG. 8 is a circuit diagram for explaining an impedance of an electrical conduction path in a smoothing capacitor.

FIG. 8 shows a circuit diagram of the smoothing capacitor 310 based on these impedances. Assuming that Z1 to Z4 each represents the total impedance of the positive electrode bus bar 330 and the negative electrode bus bar 340 on the electrical conduction path of the respective capacitor element 320 in the first to fourth columns, these four impedances Z1 to Z4 are expressed by the following expression.

$$Z1=(Zpm1+Zpb1)+(Znb1+Znm1)$$

$$Z2=(Zpm1+Zpm2+Zpb2)+(Znb2+Znm2+Znm1)$$

$$Z3=(Zpm1+Zpm2+Zpm3+Zpb3)+(Znb3+Znm3+Znm2+Znm1)$$

$$Z4=(Zpm1+Zpm2+Zpm3+Zpm4+Zpb4)+(Znb4+Znm4+Znm3+Znm2+Znm1) \quad \text{<Expression 1>}$$

Figure 9:
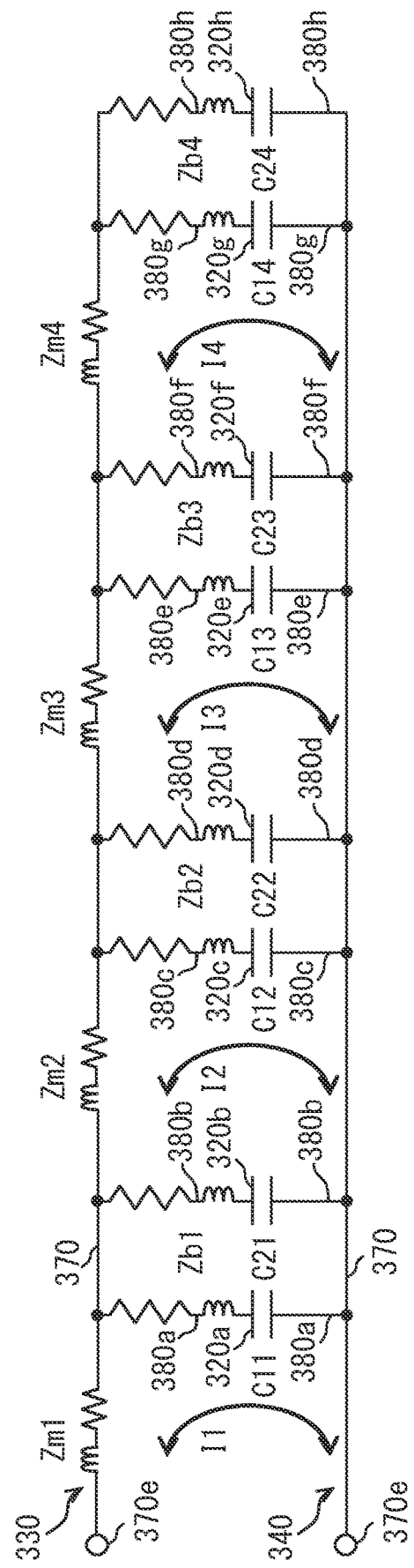
FIG. 9 is a circuit diagram illustrating the impedance shown in FIG. 8 in a simplified manner.

If the distinction between the positive electrode bus bar 330 and the negative electrode bus bar 340 is eliminated, the circuit diagram shown in FIG. 8 can be converted into an equivalent circuit shown in FIG. 9. In the equivalent circuit shown in FIG. 9, the distinction between the positive electrode bus bar 330 and the negative electrode bus bar 340 is eliminated. Based on the equivalent circuit shown in FIG. 9, the impedances Z1-Z4 are represented by the following expression.

$Z1=Zm1+Zb1$ $Z2=Zm1+Zm2+Zb2$ $Z3=Zm1+Zm2+Zm3+Zb3$ $Z4=Zm1+Zm2+Zm3+Zm4+Zb4$ <Expression 2>

As described above, the impedance of the branch bus bar 380 decreases as the column number of the branch bus bar 380 increases. Therefore, the magnitude relationship of the impedances of the branch bus bars 380 in the first to fourth columns is represented by the following expression.

$Zb1>Zb2>Zb3>Zb4$ <Expression 3>

Because of the relationships represented by the expressions 2 and 3, an occurrence of differences in the values of the impedances Z1 to Z4 of the positive electrode bus bar 330 and the negative electrode bus bar 340 with respect to the capacitor elements 320 in the first to fourth columns is suppressed.

In the present embodiment, the widths of the eight branch bus bars 380 are adjusted to implement the equation of Z1=Z2=Z3=Z4. The widths of the branch bus bars 380 are adjusted based on this equation and the expression 2 to satisfy the following expression.

$Zb1=Zm2+Zb2=Zm2+Zm3+Zb3=Zm2+Zm3+Zm4+Zb4$ <Expression 4>

However, due to manufacturing errors, connection resistance, or the like, the relationship represented by the expression 4 will not be satisfied strictly. There is a difference of at least ±5% between the values of the impedances Z1 to Z4.

Advantageous Effects

As described above, in the main bus bar 370, the impedance of the electrical conduction path between the through hole 370e and the branch bus bar 380 increases as the connecting position of the branch bus bar 380 to the main bus bar 370 separates further from the through hole 370e. On the other hand, the impedance of the electrical conduction path of the branch bus bar 380 decreases as the connecting position of the branch bus bar 380 to main bus bar 370 separates further from through hole 370e. Therefore, it is possible to suppress the occurrence of a difference in the impedance of the electrical conduction path between the positive electrode bus bar 330 or the negative electrode bus bar 340 and each of the capacitor elements 320.

In addition, the conductance is equal between the capacitor elements 320. Therefore, it is possible to suppress the occurrence of differences in the impedance of the electrical conduction path between the P bus bar 301 and the N bus bar 302 between the capacitor elements 320. The occurrence of differences in amounts of currents I1 to I4 flowing through the capacitor elements 320 in the first to fourth columns shown in FIGS. 8 and 9 is suppressed.

As a result, the occurrence of differences in Joule heat generated in the capacitor elements 320 is suppressed. It is possible to suppress the difference in lifetime between the capacitor elements 320.

In addition, the Coulomb force generated in the capacitor elements 320 is suppressed from becoming extremely high in some capacitor elements 320. Even if the capacitor elements 320 show a behavior of vibrating due to the change in the direction of action of the Coulomb force due to the time change of the current because of the PWM-control of the switches included in the switch group 350, it is less likely that the vibration amplitude will be partly extremely increased. An occurrence of abnormal noise due to the vibration of capacitor elements 320 is suppressed.

Second Embodiment

Figure 10:
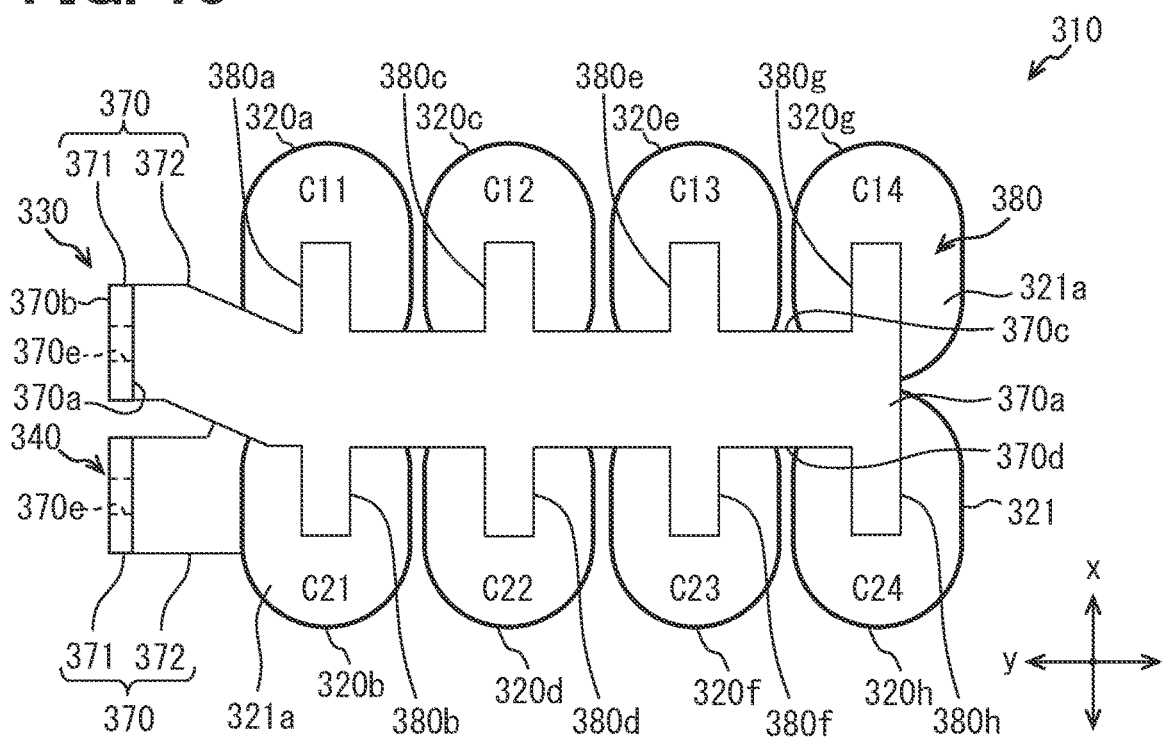
FIG. 10 is a top view of a smoothing capacitor according to a second embodiment.

Next, a second embodiment of the present disclosure will be described based on FIG. 10 and FIG. 11.

In the first embodiment, the four branch bus bars 380 arranged in the y direction have different widths. In the present embodiment, on the other hand, the four branch bus bars 380 arranged in the y direction have different thicknesses.

Figure 11:
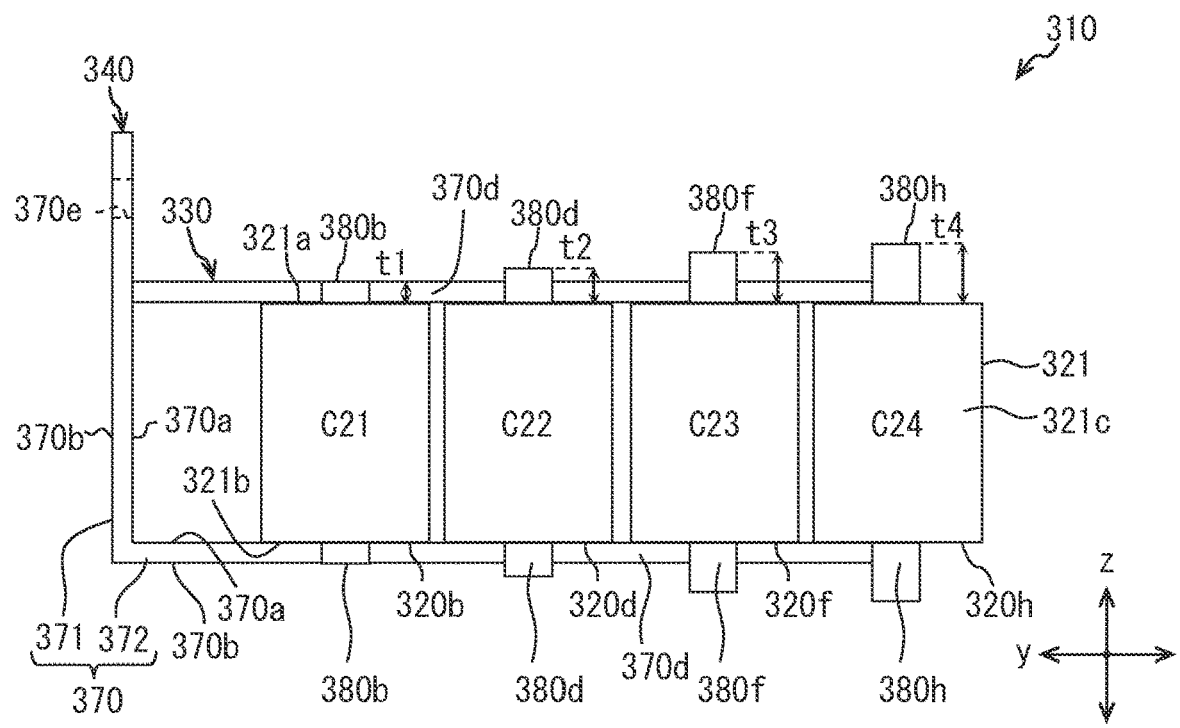
FIG. 11 is a side view of the smoothing capacitor according to the second embodiment.

The thickness of the four branch bus bars 380 arranged in the y-direction increases as the ordinal number increases, as indicated by t1, t2, t3, and t4 in FIG. 11. Therefore, as the ordinal number increases, the cross-sectional area perpendicular to the extending direction of the branch bus bar 380 increases. The impedance of the electrical conduction path of branch bus bar 380 decreases as the connecting position of the branch bus bar 380 to the main bus bar 370 becomes farther from the through hole 370e.

As described above, a power conversion device 300 according to the present embodiment includes components similar to those of the power conversion device 300 described in the first embodiment. Therefore, it goes without saying that the power conversion device 300 according to the present embodiment also has the similar effects to those of the power conversion device 300 according to the first embodiment. Other embodiments described hereinafter also achieve the similar effects. Therefore, the description thereof will not be repeated.

Third Embodiment

Figure 12:
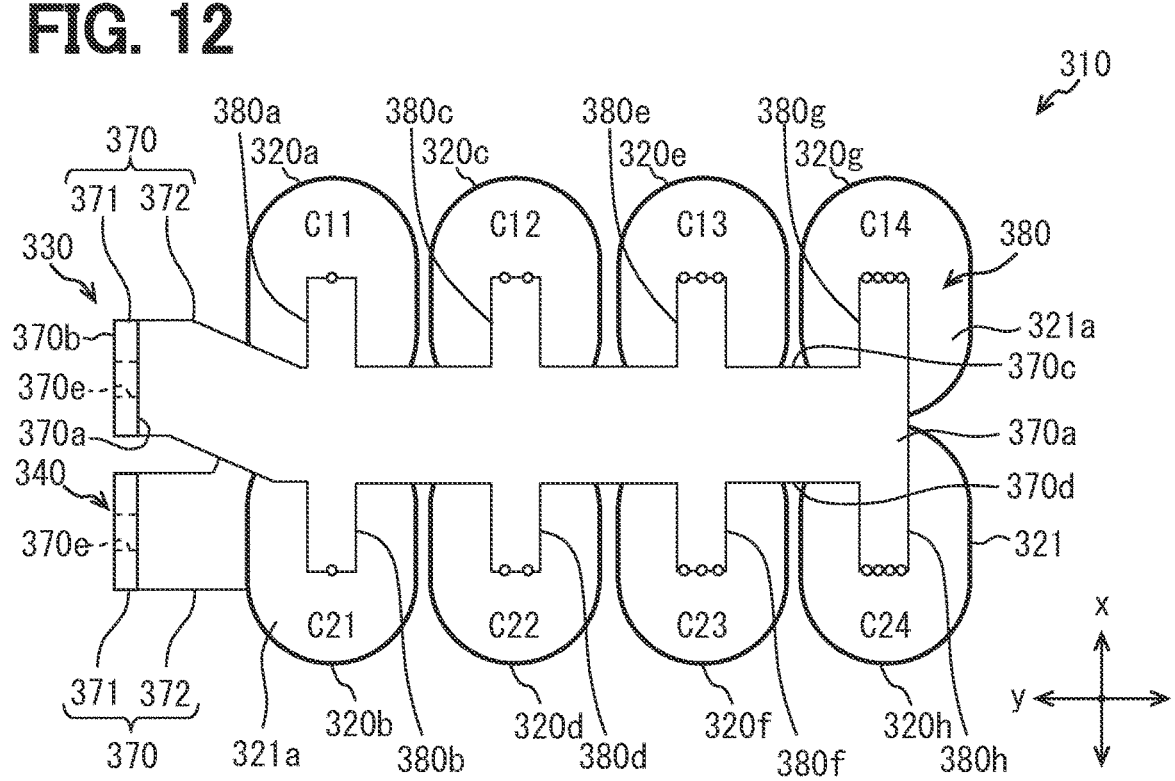
FIG. 12 is a top view of a smoothing capacitor according to a third embodiment.
Figure 13:
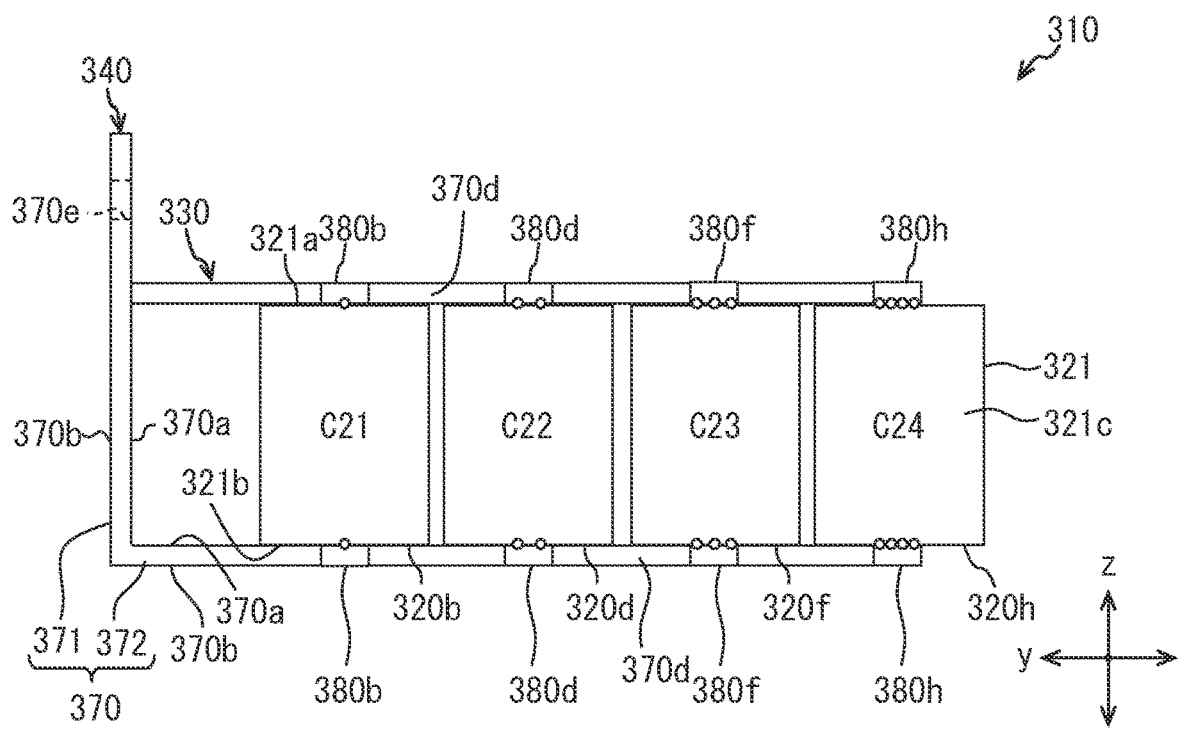
FIG. 13 is a side view of the smoothing capacitor according to the third embodiment.

Next, a third embodiment will be described with reference to FIG. 12 and FIG. 13.

In the first embodiment, the width of the four branch bus bars 380 arranged in the y direction increases as the function of distance of the connection positions of the branch bus bars 380 to the main bus bar 370 from the through hole 370e. In the present embodiment, on the other hand, the four branch bus bars 380 arranged in the y direction have the same shape. Instead, as shown by the difference in the number of white circles in FIGS. 12 and 13, the connecting area of each of the four branch bus bars 380 with the corresponding capacitor element 320 as the connecting position of the branch bus bar 380 with the main bus bar 370 becomes farther from the through hole 370e.

Therefore, the impedance between branch bus bar 380 and the corresponding capacitor element 320 decreases as the connecting position of branch bus bar 380 to the main bus bar 370 becomes farther from the through hole 370e. In the case of solder connection, the magnitude relationship of the connection areas is realized by adjusting the amount of solder applied or the application area of the solder. In the case of laser welding, the magnitude relationship of the connection areas is realized by adjusting the number of welding points or the like.

Fourth Embodiment

A fourth embodiment of the present disclosure will be described with reference to FIG. 14.

In the first embodiment, the four branch bus bars 380 arranged in the y direction have the different widths. In the present embodiment, on the other hand, the four branch bus bars 380 arranged in the y direction have different lengths in the extending direction (x direction).

Figure 14:
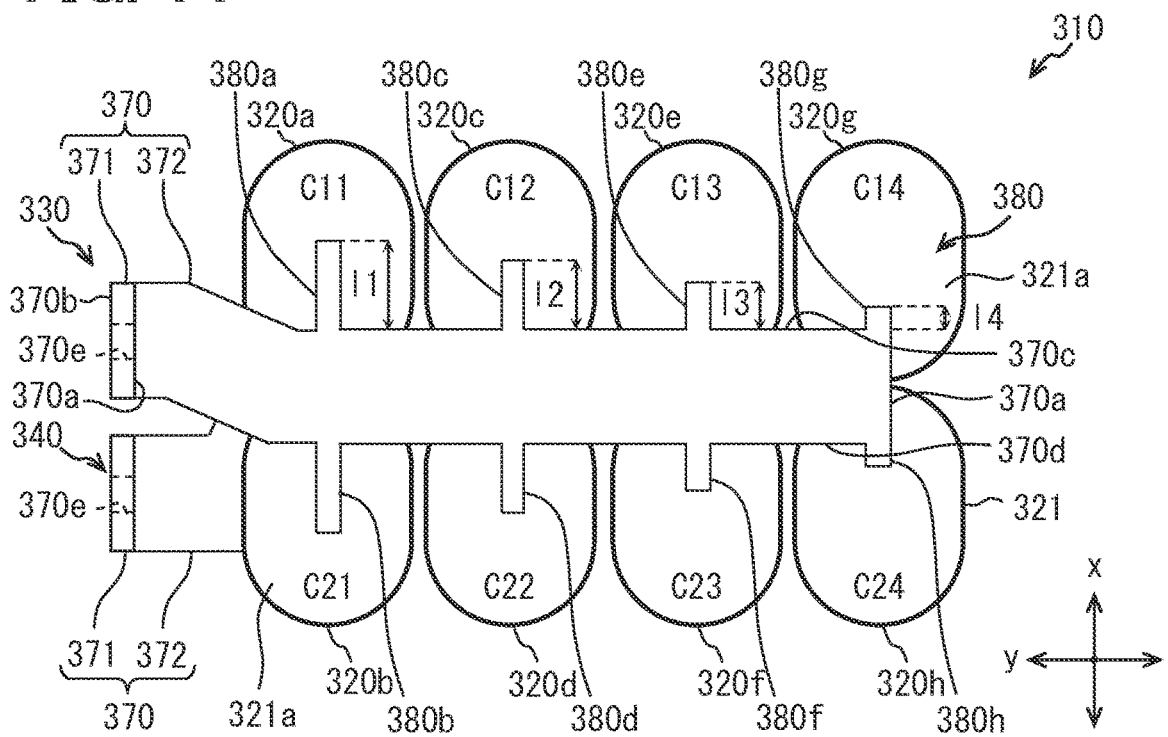
FIG. 14 is a top view of a smoothing capacitor according to a fourth embodiment.

The lengths of the four branch bus bars 380 arranged in the y direction reduce as the ordinal number increases, as indicated by I1, I2, I3, and I4 in FIG. 14. Therefore, the impedance of the electrical conduction path of the branch bus bar 380 decreases as the connection position of the branch bus bar 380 to the main bus bar 370 separates further from the through hole 370e.

Fifth Embodiment

A fifth embodiment of the present disclosure will be described with reference to FIG. 15.

In the first embodiment, the four branch bus bars 380 arranged in the y direction have the different widths. In the present embodiment, on the other hand, the four branch bus bars 380 arranged in the y direction are formed with cutouts 381.

The size of the cutouts 381 formed in the four branch bus bars 380 arranged in the y direction decreases as the ordinal number increases. Therefore, the impedance of the electrical conduction path of the branch bus bar 380 increases as the connection position of the branch bus bar 380 to the main bus bar 370 is closer to the through hole 370e.

Figure 15:
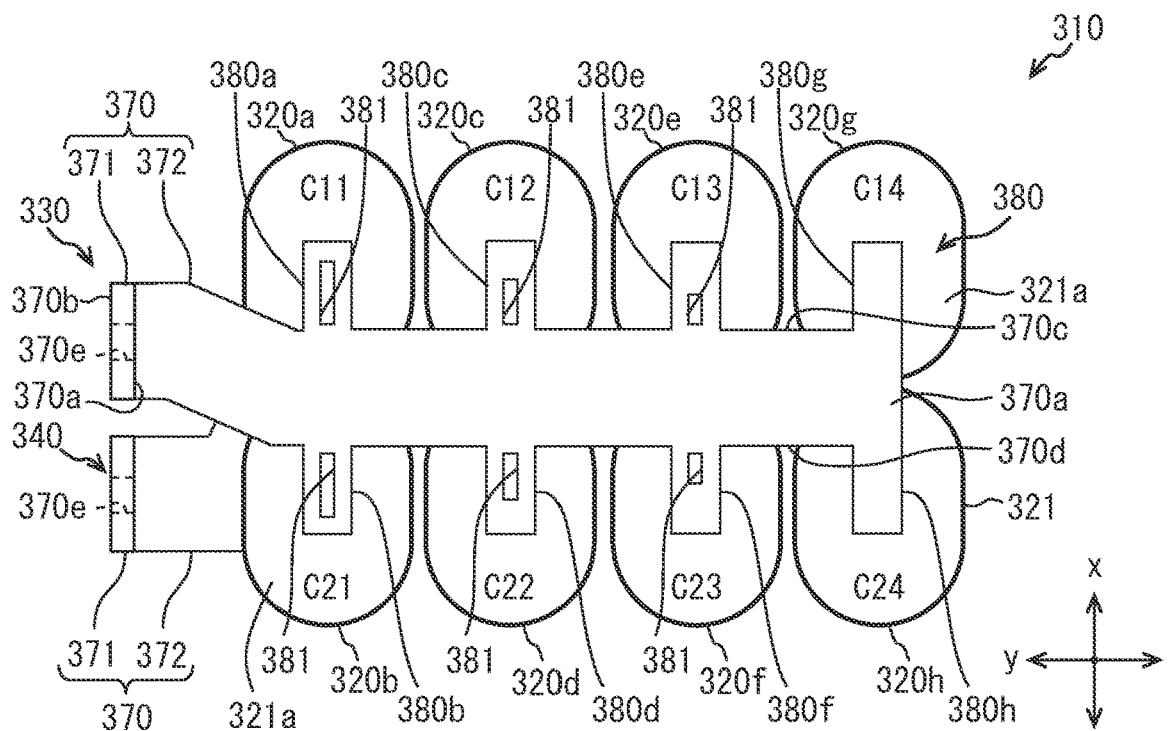
FIG. 15 is a top view of a smoothing capacitor according to a fifth embodiment.

Note that FIG. 15 shows an example in which the cutout 381 is not formed in the branch bus bar 380 having the largest ordinal number among the four branch bus bars 380 arranged in the y direction. However, a configuration in which all of the four branch bus bars 380 have the cutouts 381 can also be adopted.

In addition, FIG. 15 shows an example in which the cutout 381 formed in the branch bus bar 380 is an aperture. However, the formation of the cutout 381 is not limited to the example described above, and the cutout 381 may be provided by cutting out a part of the branch bus bar 380 with respect to at least one of the thickness, width, and length directions.

Sixth Embodiment

Figure 16:
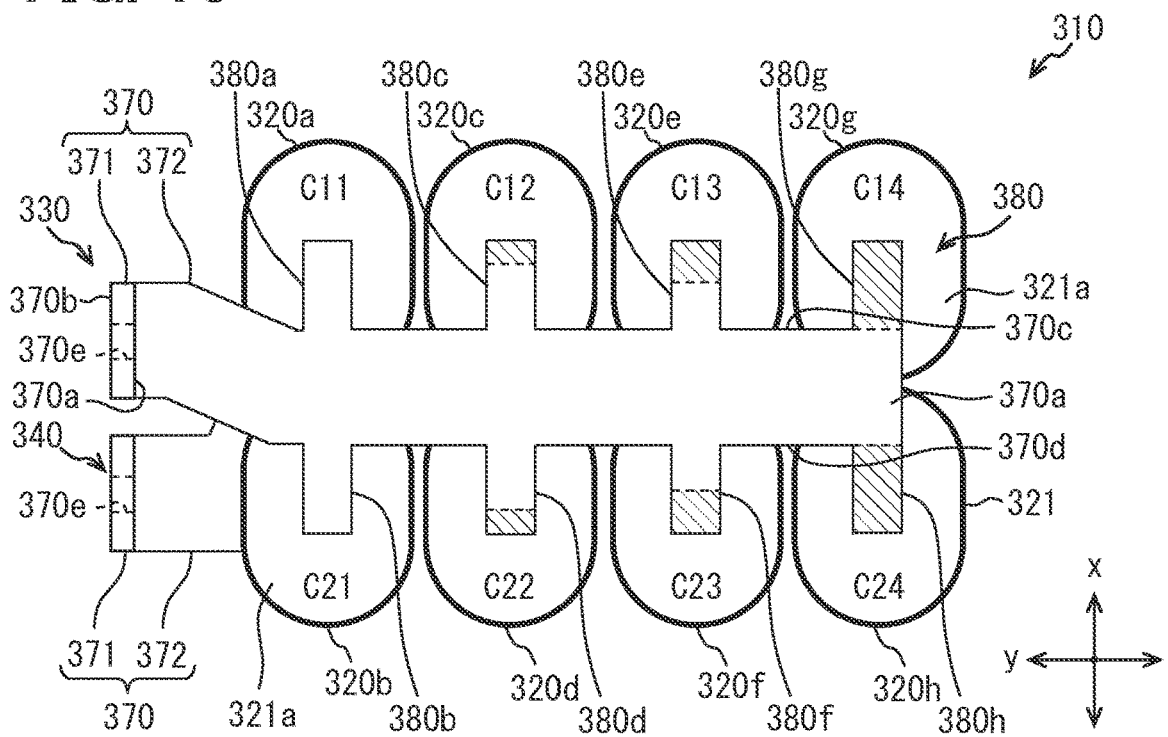
FIG. 16 is a top view of a smoothing capacitor according to a sixth embodiment.

A sixth embodiment will be described with reference to FIG. 16.

In the embodiments described hereinabove, the eight branch bus bars 380 are integrally connected to the main bus bar 370. In the present embodiment, on the other hand, a part or some of the eight branch bus bars 380 are joined to the main bus bar 370 by welding or the like. A part or some of the eight branch bus bars 380 are made of a different type of conductive material (metal) from the main bus bar 370.

The two branch bus bars 380 in the first column are made of the same metal material as the main bus bar 370. However, the branch bus bars 380 in the second column and the branch bus bars 380 in the third column each include a portion made of the same metal material as the main bus bar 370 and a portion made of the different type of material. The two branch bus bars 380 in the fourth column are made of a different type of material from the main bus bar 370. In FIG. 16, the portion made of the different material is shown with hatching, and a joint portion between the portion made of the different material and the portion made of the same material as the main bus bar 370 is indicated by a dashed line. In the following description, the same metal material as that of the main bus bar 370 will be referred to as the same type material for the sake of simplicity.

The branch bus bars 380 in the first to fourth columns have the same shape. The different type material has a lower resistance or a lower magnetic permeability than the same type material. For this reason, the different type material has a lower impedance than the same type material. The amount of the different type material contained in the branch bus bars 380 in the third column is greater than that contained in the branch bus bars 380 in the second column.

As such, the impedance of the electrical conduction path of the branch bus bar 380 decreases as the column number of the branch bus bar 380 increases. In other words, the impedance of the branch bus bar 380 decreases as the connecting position of the branch bus bar 380 to the main bus bar 370 separates farther from the through hole 370e.

In addition, in the present embodiment, as the constituent material of the branch bus bar 380, the same type material and one different type material are employed as an example. However, the constituent material of the branch bus bar 380 is not limited to these two types. For example, as shown with different hatching in FIG. 17, the branch bus bars 380 of the first to fourth rows may be made of different materials. In a case of a modification shown in FIG. 17, the impedance of the constituent material of the branch bus bar 380 decreases as the row number in which branch bus bar 380 is positioned increases.

Figure 17:
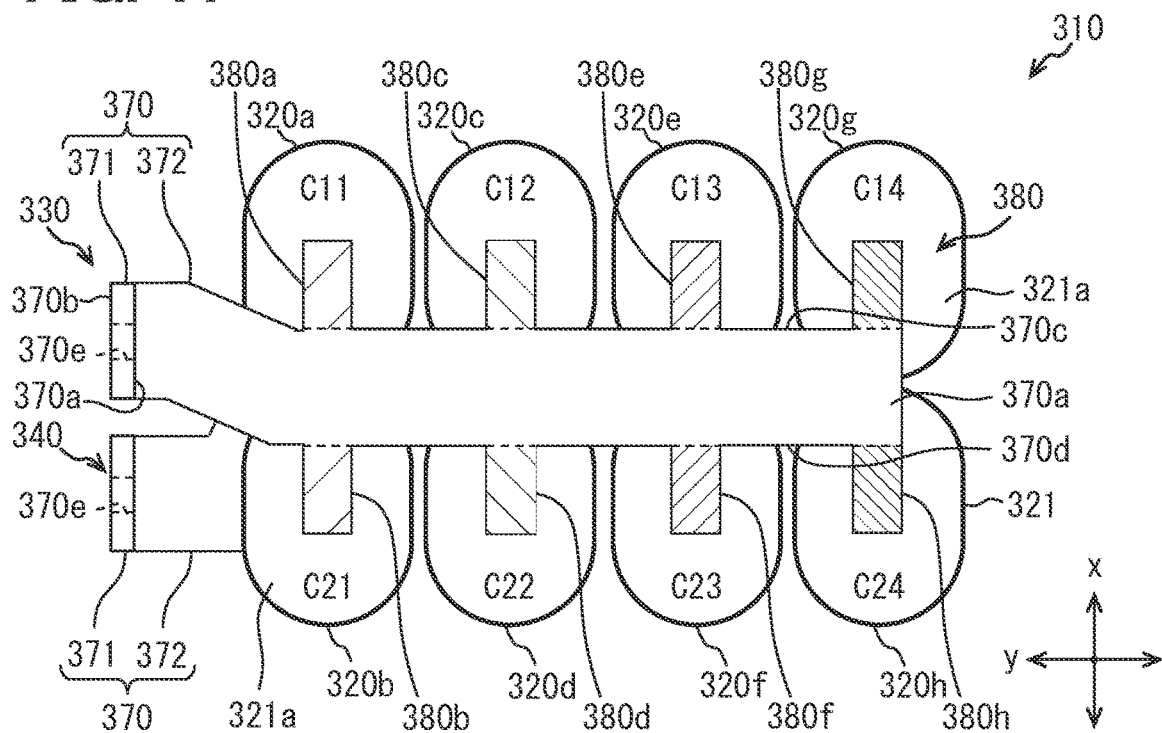
FIG. 17 is a top view of a smoothing capacitor according to the sixth embodiment.

In the present embodiment, a part of or some of the branch bus bars 380 are integrally connected to the main bus bar 370, as an example. However, for example, as shown in FIG. 17, all the branch bus bars 380 may be separate from the main bus bar 370, and the separate branch bus bars 380 may be joined to the main bus bar 370 by welding or the like. In such a modification, the shape of the main bus bar 370 can be simplified.

First Modification

In each of the embodiments described hereinabove, the four branch bus bars 380 arranged in the y direction are exemplarily spaced apart in the y direction. Alternatively, as shown in FIG. 18, the four bus bars 30 arranged in the y direction may be partly connected to each other.

Figure 18:
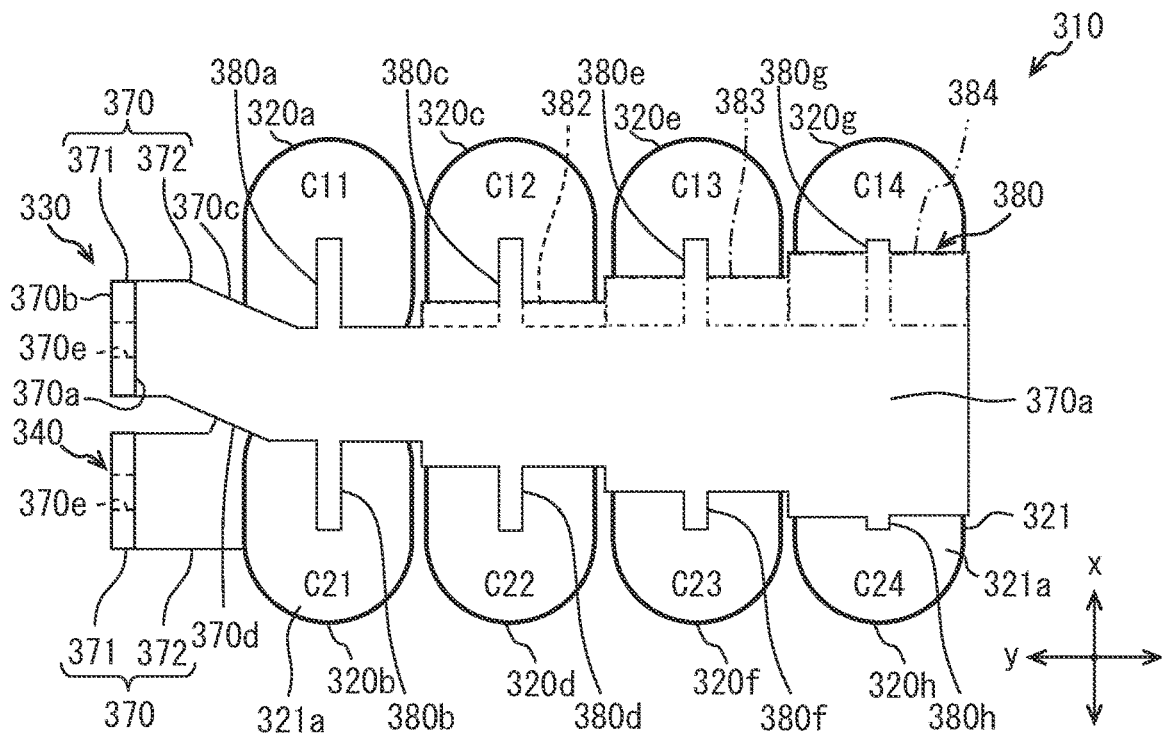
FIG. 18 is a top view of a smoothing capacitor of a first modification.

In the modification shown in FIG. 18, a first additional portion 382 indicated by a broken line is added to the branch bus bar 380 in the second row. A second additional portion 383 indicated by a dashed line is added to the branch bus bar 380 in the third row. A third additional portion 384 indicated by a chain double-dashed line is added to the branch bus bar 380 in the fourth row.

The first additional portion 382 is smaller in width and length than the second additional portion 383. The first additional portion 382 and the second additional portion 383 are connected to each other.

The second additional portion 383 is smaller in width and length than the third additional portion 384. The second additional portion 383 and the third additional portion 384 are connected to each other.

Second Modification

In each of the embodiments described hereinabove, the smoothing capacitor 310 exemplarily has eight capacitor elements 320. However, the number of capacitor elements 320 included in the smoothing capacitor 310 is not limited to the above example as long as it is plural.

Figure 19:
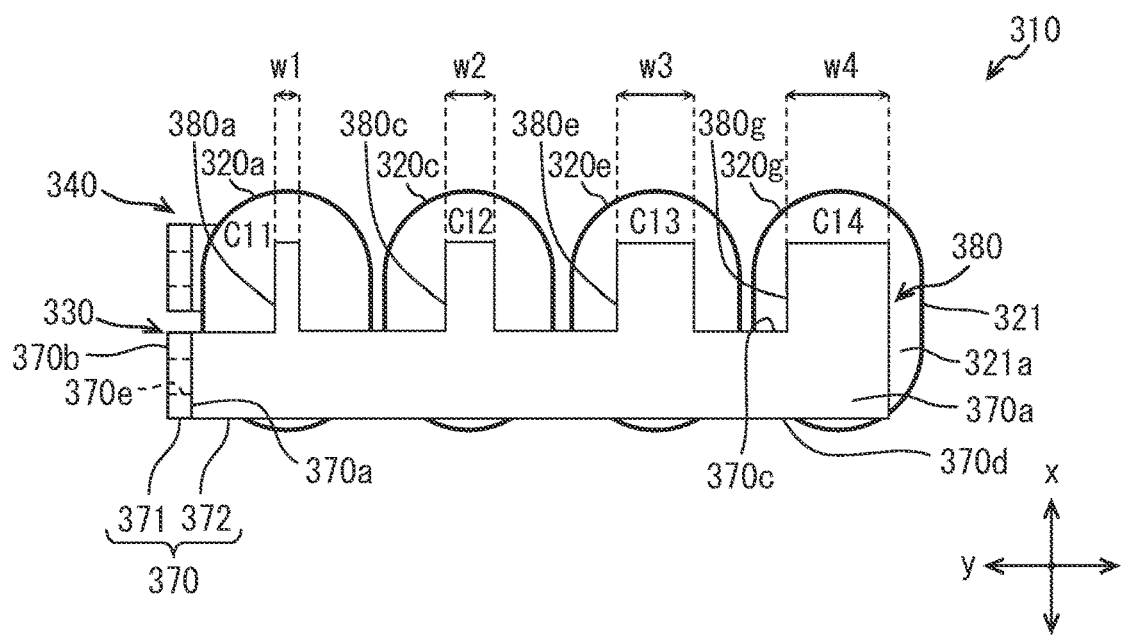
FIG. 19 is a top view of a smoothing capacitor of a second modification.

For example, the smoothing capacitor 310 may have four capacitor elements 320, as shown in FIG. 19. These four capacitor elements 320 are arranged in one row and four columns. Each of the positive electrode bus bar 330 and the negative electrode bus bar 340 has four branch bus bars 380.

Although not shown, in other matrix arrangements of a plurality of capacitor elements 320 as well, by appropriately combining the configurations of the branch bus bars 380 in the embodiments and modifications described hereinabove, the similar effects to those described in the first embodiment can be obtained.

OTHER MODIFICATIONS

In the embodiments described hereinabove, the power conversion device 300 is exemplarily applied to an in-vehicle system for an electric vehicle. Alternatively, the power conversion device 300, the smoothing capacitor 310 included therein, and the positive electrode bus bar 330 and negative electrode bus bar 340 included therein can also be applied to other in-vehicle systems such as hybrid vehicles.

In the embodiments described hereinabove, the power conversion device 300 exemplarily includes the inverter. However, the power conversion device 300 may include a converter. Various configurations applied to the smoothing capacitor 310 in the embodiments described hereinabove may also be applied to a filter capacitor included in the converter.

Furthermore, the various configurations applied to smoothing capacitor 310 described in the present disclosure may be applied not only to capacitors included in power conversion circuits, but also to capacitors included in electrical circuits electrically connected to power conversion circuits. The various configurations applied to the smoothing capacitor 310 can be applied to capacitors having a problem such as the Joule heat difference due to the difference in the current amount of the plurality of capacitor elements 320 described in the first embodiment, and electric circuits including such capacitors.

In the embodiment described hereinabove, the positive electrode bus bar 330 is exemplarily bolted to the P bus bar 301 and the negative electrode bus bar 340 is exemplarily bolted to the N bus bar 302. However, the positive electrode bus bar 330 and the P bus bar 301 may be integrated rather than separate. The negative electrode bus bar 340 and the N bus bar 302 may be integrated rather than separate. A configuration in which the P bus bar 301 and the N bus bar 302 are connected to each of the plurality of capacitor elements 320 by soldering or the like can also be adopted.

In such a modification, it is possible to suppress an occurrence of a difference in impedance on the electrical conduction paths between the plurality of capacitor elements 320 and the high-side switches 361 or the low-side switches 362 included in the switch group 350.

In the present disclosure, various example configurations for providing differences in the impedances of the plurality of branch bus bars 380 have been described as in the embodiments and modifications. The differences in the impedances in the branch bus bars 380 are provided by having difference in the magnitude of the cross-sectional areas defined orthogonal to the extending direction, the connecting area with the capacitor elements 320, the length in the extending direction, the presence or absence of the cutouts 381, the size of the of the cutouts 381, the present or absence of the different type material, the property or size of the different type materials, and the like. The impedances of the branch bus bars 380 may be differentiated by employing two or more of those examples.

Although the present disclosure has been described in accordance with the embodiment, it is understood that the present disclosure is not limited to such embodiments or structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

What is claimed is:

1. A bus bar for a plurality of capacitor elements, the plurality of capacitor elements having an equal impedance and each including a positive electrode on a first end surface and a negative electrode on a second end surface, the bus bar comprising:
    a positive electrode bus bar and a negative electrode bus bar to electrically connect the plurality of capacitor elements and an electric circuit having a switching element, wherein:
    each of the positive electrode bus bar and the negative electrode bus bar includes a main bus bar and a plurality of branch bus bars;
    the main bus bar of the positive electrode bus bar is disposed to face the first end surfaces of the plurality of capacitor elements, and is electrically connected to the electric circuit;
    each of the plurality of branch bus bars of the positive electrode bus bar includes a first end connected to the main bus bar of the positive electrode bus bar and a second end connected to the positive electrode of a corresponding one of the plurality of capacitor elements;
    the first ends of the plurality of branch bus bars of the positive electrode bus bar are connected to different positions of the main bus bar of the positive electrode bus bar from each other;
    the main bus bar of the negative electrode bus bar is disposed to face the second end surfaces of the plurality of capacitor elements, and is electrically connected to the electric circuit;
    each of the plurality of branch bus bars of the negative electrode bus bar includes a first end connected to the main bus bar of the negative electrode bus bar and a second end connected to the negative electrode of a corresponding one of the plurality of capacitor elements;
    the first ends of the plurality of branch bus bars of the negative electrode bus bar are connected to different positions of the main bus bar of the negative electrode bus bar from each other; and
    the plurality of branch bus bars of each of the positive electrode bus bar and the negative electrode bus bar are configured so that an impedance between the first end and the second end reduces as an impedance between a connecting portion of the main bus bar to the electric circuit and a connecting portion of the first end of the branch bus bar to the main bus bar increases.

2. The bus bar according to claim 1, wherein
    the plurality of branch bus bars of at least one of the positive electrode bus bar and the negative electrode bus bar include at least two branch bus bars having different areas in cross-section defined in a direction orthogonal to an extending direction of the branch bus bars.

3. The bus bar according to claim 1, wherein
the plurality of branch bus bars of at least one of the positive electrode bus bar and the negative electrode bus bar include at least two branch bus bars having different connecting areas with the corresponding capacitor elements.

4. The bus bar according to claim 1, wherein
the plurality of branch bus bars of at least one of the positive electrode bus bar and the negative electrode bus bar include at least two branch bus bars having different length between the first ends and the second ends.

5. The bus bar according to claim 1, wherein
the plurality of branch bus bars of at least one of the positive electrode bus bar and the negative electrode bus bar include at least one branch bus bar having a cutout.

6. The bus bar according to claim 1, wherein
the plurality of branch bus bars of at least one of the positive electrode bus bar and the negative electrode bus bar include at least one branch bus bar containing a different material from a material of the main bus bar.

7. A capacitor comprising:
a plurality of capacitor elements having an equal inductance, and each including a positive electrode on a first end surface and a negative electrode on a second end surface; and
a positive electrode bus bar and a negative electrode bus bar electrically connecting the plurality of capacitor elements and an electric circuit having a switching element, wherein:
each of the positive electrode bus bar and the negative electrode bus bar includes a main bus bar and a plurality of branch bus bars;
the main bus bar of the positive electrode bus bar is disposed to face the first end surfaces of the plurality of capacitor elements, and is electrically connected to the electric circuit;
each of the plurality of branch bus bars of the positive electrode bus bar includes a first end connected to the main bus bar of the positive electrode bus bar and a second end connected to the positive electrode of a corresponding one of the plurality of capacitor elements;
the first ends of the plurality of branch bus bars of the positive electrode bus bar are connected to different positions of the main bus bar of the positive electrode bus bar from each other;
the main bus bar of the negative electrode bus bar is disposed to face the second end surfaces of the plurality of capacitor elements, and is electrically connected to the electric circuit;
each of the plurality of branch bus bars of the negative electrode bus bar includes a first end connected to the main bus bar of the negative electrode bus bar and a second end connected to the negative electrode of a corresponding one of the plurality of capacitor elements;
the first ends of the plurality of branch bus bars of the negative electrode bus bar are connected to different positions of the main bus bar of the negative electrode bus bar from each other; and
the plurality of branch bus bars of each of the positive electrode bus bar and the negative electrode bus bar are configured so that an impedance between the first end and the second end reduces as an impedance between a connecting portion of the main bus bar to the electric circuit and a connecting portion of the first end of the branch bus bar to the main bus bar increases.

8. A power conversion device comprising;
an electric circuit including a switching element;
a plurality of capacitor elements having an equal inductance and each including a positive electrode on a first end surface and a negative electrode on a second end surface; and
a positive electrode bus bar and a negative electrode bus bar electrically connecting the plurality of capacitor elements and the electric circuit, wherein
each of the positive electrode bus bar and the negative electrode bus bar includes a main bus bar and a plurality of branch bus bars;
the main bus bar of the positive electrode bus bar is disposed to face the first end surfaces of the plurality of capacitor elements, and is electrically connected to the electric circuit;
each of the plurality of branch bus bars of the positive electrode bus bar includes a first end connected to the main bus bar of the positive electrode bus bar and a second end connected to the positive electrode of a corresponding one of the plurality of capacitor elements;
the first ends of the plurality of branch bus bars of the positive electrode bus bar are connected to different positions of the main bus bar of the positive electrode bus bar from each other;
the main bus bar of the negative electrode bus bar is disposed to face the second end surfaces of the plurality of capacitor elements, and is electrically connected to the electric circuit;
each of the plurality of branch bus bars of the negative electrode bus bar includes a first end connected to the main bus bar of the negative electrode bus bar and a second end connected to the negative electrode of a corresponding one of the plurality of capacitor elements;
the first ends of the plurality of branch bus bars of the negative electrode bus bar are connected to different positions of the main bus bar of the negative electrode bus bar from each other; and
the plurality of branch bus bars of each of the positive electrode bus bar and the negative electrode bus bar are configured so that an impedance between the first end and the second end reduces as an impedance between a connecting portion of the main bus bar to the electric circuit and a connecting portion of the first end of the branch bus bar to the main bus bar increases.

* * * * *